United States Patent
Shimada et al.

(10) Patent No.: US 7,469,345 B2
(45) Date of Patent: *Dec. 23, 2008

(54) METHODS AND APPARATUS FOR SECURE DISTRIBUTION OF PROGRAM CONTENT

(75) Inventors: Muneki Shimada, Tokyo (JP); Toyoshi Okada, Tokyo (JP); Yousuke Kimoto, Kanagawa (JP); Kazuhiro Kanee, Chiba (JP); Kenjiro Komaki, Saitama (JP)

(73) Assignee: Sony Computer Entertainment Inc. (JP)

( * ) Notice: Subject to any disclaimer, the term of this patent is extended or adjusted under 35 U.S.C. 154(b) by 768 days.

This patent is subject to a terminal disclaimer.

(21) Appl. No.: 10/316,675

(22) Filed: Dec. 11, 2002

(65) Prior Publication Data

US 2003/0123670 A1    Jul. 3, 2003

(30) Foreign Application Priority Data

Dec. 13, 2001    (JP) .............................. 2001-380609

(51) Int. Cl.
*G06F 12/14* (2006.01)
(52) U.S. Cl. ..................... 713/193; 726/26; 726/27; 380/201
(58) Field of Classification Search ......... 380/200–202, 380/228, 232, 229; 713/189, 193; 726/26–33; 705/51, 55–59; 725/25, 31, 28; 709/229, 709/225

See application file for complete search history.

(56) References Cited

U.S. PATENT DOCUMENTS

| | | | | |
|---|---|---|---|---|
| 4,688,169 A | * | 8/1987 | Joshi | .............................. 726/29 |
| 5,046,090 A | * | 9/1991 | Walker et al. | ............... 380/202 |
| 5,577,232 A | | 11/1996 | Priem et al. | |
| 5,757,908 A | * | 5/1998 | Cooper et al. | ............... 713/165 |
| 5,805,551 A | | 9/1998 | Oshima et al. | |
| 5,862,325 A | | 1/1999 | Reed et al. | |
| 5,930,358 A | | 7/1999 | Rao | |
| 5,951,639 A | | 9/1999 | MacInnis | |
| 5,982,892 A | | 11/1999 | Hicks et al. | |

(Continued)

FOREIGN PATENT DOCUMENTS

EP    0519695 A2    12/1992

(Continued)

OTHER PUBLICATIONS

Japanese Office Action dated Nov. 14, 2006, Application No. 2003-551943.

(Continued)

*Primary Examiner*—Kimyen Vu
*Assistant Examiner*—Nirav Patel
(74) *Attorney, Agent, or Firm*—Lerner, David, Littenberg, Krumholz & Mentlik, LLP

(57) ABSTRACT

Methods and apparatus in accordance with the present invention are operable to carry out certain functions including: receiving an encrypted program at a processing apparatus; transmitting at least some identification information related to the processing apparatus over a network to an administrator; receiving an encrypted decryption key at the processing apparatus over the network from the administrator in response to the at least some identification information; decrypting the encrypted decryption key; decrypting the encrypted program using the decryption key; re-encrypting the program using at least some of the identification information ; and storing the identification information and the re-encrypted program in a first storage device.

40 Claims, 17 Drawing Sheets

U.S. PATENT DOCUMENTS

| | | | |
|---|---|---|---|
| 6,006,190 A | 12/1999 | Baena-Arnaiz et al. | |
| 6,075,862 A * | 6/2000 | Yoshida et al. | 380/28 |
| 6,115,471 A | 9/2000 | Oki et al. | |
| 6,189,146 B1 | 2/2001 | Misra et al. | |
| 6,347,846 B1 | 2/2002 | Nakamura et al. | |
| 6,427,132 B1 | 7/2002 | Bowman-Amuah | |
| 6,487,723 B1 | 11/2002 | MacInnis | |
| 6,607,136 B1 | 8/2003 | Atsmon et al. | |
| 6,668,331 B1 | 12/2003 | Gomes et al. | |
| 6,732,106 B2 * | 5/2004 | Okamoto et al. | 707/100 |
| 6,834,348 B1 * | 12/2004 | Tagawa et al. | 713/193 |
| 6,839,837 B1 * | 1/2005 | Morishita | 713/164 |
| 6,879,965 B2 | 4/2005 | Fung et al. | |
| 6,889,321 B1 | 5/2005 | Kung et al. | |
| 6,971,022 B1 * | 11/2005 | Katta et al. | 713/193 |
| 6,993,664 B2 * | 1/2006 | Padole et al. | 705/59 |
| 7,100,195 B1 | 8/2006 | Underwood | |
| 7,171,662 B1 | 1/2007 | Misra et al. | |
| 2001/0010046 A1 | 7/2001 | Muyres et al. | |
| 2001/0018743 A1 * | 8/2001 | Morishita | 713/193 |
| 2001/0051928 A1 | 12/2001 | Brody | |
| 2002/0026424 A1 * | 2/2002 | Akashi | 705/57 |
| 2002/0032584 A1 | 3/2002 | Doctor et al. | |
| 2002/0046229 A1 | 4/2002 | Yutaka et al. | |
| 2002/0052728 A1 | 5/2002 | Yutaka | |
| 2002/0077988 A1 * | 6/2002 | Sasaki et al. | 705/59 |
| 2003/0072271 A1 | 4/2003 | Simmons et al. | |
| 2003/0123670 A1 | 7/2003 | Shimada et al. | |
| 2003/0126430 A1 | 7/2003 | Shimada et al. | |
| 2003/0140134 A1 | 7/2003 | Swanson et al. | |
| 2003/0177093 A1 * | 9/2003 | Hirano et al. | 705/50 |
| 2004/0243754 A1 | 12/2004 | Sakamoto | |
| 2005/0034114 A1 | 2/2005 | Weik et al. | |
| 2005/0066324 A1 | 3/2005 | Delgado et al. | |

FOREIGN PATENT DOCUMENTS

| | | |
|---|---|---|
| EP | 0 679 980 | 11/1995 |
| JP | 2000-242604 | 9/1999 |
| JP | 11-275516 | 10/2000 |
| KR | 20050029705 | 3/2005 |
| TW | 470885 | 3/2005 |
| WO | WO 00/56068 | 9/2000 |
| WO | WO-01/78303 | 10/2001 |
| WO | 03/021432 | 3/2003 |

OTHER PUBLICATIONS

U.S. Appl. No. 10/316,309, filed Dec. 11, 2002.
U.S. Appl. No. 11/230,748, filed Sep. 20, 2005.
U.S. Appl. No. 11/231,131, filed Sep. 20, 2005.

* cited by examiner

FIG. 18

| MACHINE ID | VIRTUAL ID | MEDIUM ID |
|---|---|---|
| K1234 | — | — |
| K2345 | B5678 | M6980 |
| K6789 ← FAILURE | B9012 | M2468 |
| K0987 | — | — |
| ⋮ | ⋮ | ⋮ |

FIG. 19

| MACHINE ID | VIRTUAL ID | MEDIUM ID |
|---|---|---|
| K1234 | — | — |
| K2345 | B5678 | M6980 |
| K1143 ← NEW MACHINE ID | B9012 | M2468 |
| K0987 | — | — |
| ⋮ | ⋮ | ⋮ |

METHODS AND APPARATUS FOR SECURE DISTRIBUTION OF PROGRAM CONTENT

BACKGROUND OF THE INVENTION

The present invention relates to methods and apparatus for secure distribution of program content, which are directed to the prevention of unauthorized copying and/or distribution of the program content.

Program content may include application programs, such as video game programs, word processing programs, spread sheet programs, etc.; and system programs, such as operating systems, boot programs, etc. Program content, such as computer programs, are typically distributed to end-users by way of transportable storage media, such as CD-ROMs, DVD-ROMs, etc., which contain the program content. Program content may also be distributed to end-users by way of downloading the program content over a network, such as from a server to the user over the Internet.

The conventional methods for distributing program content are not secure because unauthorized copies thereof may be made and shared among a plurality of end-users. For example, if a computer program is distributed to a particular end-user by way of a storage medium, that user may permit unauthorized copies of the computer program to be distributed and stored on equipment controlled by other end-users. Typically, these unauthorized copies are stored on hard disk drives, CD-ROMs, and the like. Similarly, if the computer program is distributed to the end-user by way of transmission over a network, unauthorized copies of the computer program may be made and distributed to other users. For example, once the computer program is stored on the authorized end-user's equipment, he or she may forward a copy of the computer program to another user by way of a storage medium (e.g., an optical disk, a magnetic disk, etc.) or by way of an attachment to an electronic mail message.

Accordingly, there are needs in the art for new methods and apparatus for the secure distribution of program content to end-users, which ameliorates the problems associated with the proliferation of unauthorized copies of the program content.

SUMMARY OF THE INVENTION

In accordance with one or more aspects of the present invention, an apparatus is operable to receive an encrypted program, where the apparatus includes: a network interface operable to provide communication with a network such that (i) at least some identification information related to the apparatus may be transmitted over the network to an administrator, and (ii) an encrypted decryption key may be received over the network from the administrator in response to the at least some identification information; a decryption device operable to decrypt the encrypted decryption key, to decrypt the encrypted program using the decryption key, and to re-encrypt the program using at least some of the identification information; and a first storage device operable to store the identification information and the re-encrypted program.

Preferably, the identification information includes a machine ID that is substantially unique to the apparatus; and the network interface is operable to facilitate transmission of the machine ID over the network to the administrator such that the encrypted decryption key may be received over the network from the administrator in response to the machine ID.

The network interface is preferably further operable to facilitate the reception of an encrypted virtual ID over the network from the administrator, the virtual ID being associated with the machine ID. Preferably, the decryption device is operable to decrypt the encrypted virtual ID using the machine ID, to decrypt the encrypted decryption key using the virtual ID, to decrypt the encrypted program using the decryption key, and to re-encrypt the program using the virtual ID.

Preferably, the first storage device is further operable to store the machine ID and the encrypted virtual ID. The first storage device may be removably connectable with the apparatus.

It is preferred that the decryption device is operable to decrypt the encrypted virtual ID using the machine ID, and to decrypt the re-encrypted program using the virtual ID such that the apparatus is capable of executing the program.

The apparatus preferably further includes a second storage device containing the machine ID; and a processor operable to compare the machine ID stored in the first storage device with the machine ID contained in the second storage device, and to proscribe use of the machine ID contained in either of the storage devices to decrypt the encrypted virtual ID when they do not match.

The processor is preferably further operable to prompt a user of the apparatus to select a re-association routine when the machine ID stored in the first storage device does not match the machine ID contained in the second storage device. The network interface is preferably operable to facilitate: the transmission of the machine ID contained in the second storage device, when it does not match the machine ID stored in the first storage device, over the network to the administrator; and the reception of an new encrypted virtual ID over the network from the administrator, the virtual ID being associated with the machine ID contained in the second storage device. Preferably, the first storage device is further operable to replace the encrypted virtual ID with the new encrypted virtual ID. It is preferred that the decryption device is operable to decrypt the new encrypted virtual ID using the machine ID contained in the second storage device, and to decrypt the re-encrypted program using the virtual ID such that the apparatus is capable of executing the program.

In accordance with one or more further aspects of the present invention, an apparatus is operable to receive an encrypted program, where the apparatus includes: a storage medium interface operable to receive an encrypted first decryption key from a storage medium produced by an administrator; a network interface operable to provide communication with a network such that (i) at least some identification information related to the apparatus may be transmitted over the network to the administrator, and (ii) an encrypted second decryption key may be received over the network from the administrator in response to the at least some identification information; a decryption device operable to decrypt the encrypted second decryption key, to decrypt the encrypted first decryption key using the second decryption key, to decrypt the encrypted program using the first decryption key, and to re-encrypt the program using at least some of the identification information; and a first storage device operable to store the identification information and the re-encrypted program.

In accordance with one or more further aspects of the present invention, an apparatus includes: a network interface operable to provide communication with a network such that respective identification information, each being related to a respective processing apparatus, may be received over the network from the processing apparatus; a database operable to store respective registration information, each corresponding with a respective one of the processing apparatus and including the identification information thereof; and a data processor operable to search the database for registration information containing identification information matching any received identification information, wherein: the network interface is further operable to facilitate the transmission of an encrypted decryption key to the processing apparatus over the network in response to the received identification information, and the decryption key may be used to decrypt an encrypted program located at the processing apparatus.

In accordance with one or more further aspects of the present invention, the network interface is further operable to facilitate the transmission of an encrypted second decryption key to the processing apparatus over the network in response to the received identification information, and the second decryption key may be used to decrypt an encrypted first decryption key, which may be used to decrypt an encrypted program located at the processing apparatus.

In accordance with one or more further aspects of the present invention, a method includes receiving an encrypted program at a processing apparatus; transmitting at least some identification information related to the processing apparatus over a network to an administrator; receiving an encrypted decryption key at the processing apparatus over the network from the administrator in response to the at least some identification information; decrypting the encrypted decryption key; decrypting the encrypted program using the decryption key; re-encrypting the program using at least some of the identification information; and storing the identification information and the re-encrypted program in a first storage device.

In accordance with one or more further aspects of the present invention, a method includes receiving an encrypted program at a processing apparatus; receiving an encrypted first decryption key at the processing apparatus; transmitting at least some identification information related to the processing apparatus over a network to an administrator; receiving an encrypted second decryption key at the processing apparatus over the network from the administrator in response to the at least some identification information; decrypting the encrypted second decryption key; decrypting the encrypted first decryption key using the second decryption key; decrypting the encrypted program using the first decryption key; re-encrypting the program using at least some of the identification information; and storing the identification information and the re-encrypted program in a first storage device.

In accordance with one or more further aspects of the present invention, a method includes receiving respective identification information, each being related to a respective processing apparatus, over a network from the processing apparatus; storing in a database respective registration information, each corresponding with a respective one of the processing apparatus and including the identification information thereof; searching the database for registration information containing identification information matching any received identification information; transmitting an encrypted decryption key over the network to the processing apparatus in response to the received identification information, where the decryption key may be used to decrypt an encrypted program located at the processing apparatus.

In accordance with one or more further aspects of the present invention, a method includes receiving respective identification information, each being related to a respective processing apparatus, over a network from the processing apparatus; storing in a database respective registration information, each corresponding with a respective one of the processing apparatus and including the identification information thereof; searching the database for registration information containing identification information matching any received identification information; transmitting an encrypted second decryption key over the network to the processing apparatus in response to the received identification information, where the second decryption key may be used to decrypt and encrypted first decryption key, which may be used to decrypt an encrypted program located at the processing apparatus.

Further aspects, features, advantages, etc. of the invention will become apparent to one skilled in the art in view of the description herein taken in conjunction with the accompanying drawings.

BRIEF DESCRIPTION OF THE DRAWINGS

For the purposes of illustrating the invention, there are shown in the drawings forms that are presently preferred, it being understood, however, that the invention is not limited to the precise arrangements and instrumentalities shown.

FIG. 18 is a block diagram of certain database content in accordance with one or more aspects of the present invention;

FIG. 19 is a block diagram illustrating further features of the database content of FIG. 18;

DETAILED DESCRIPTION OF PREFERRED EMBODIMENTS

Figure 1:
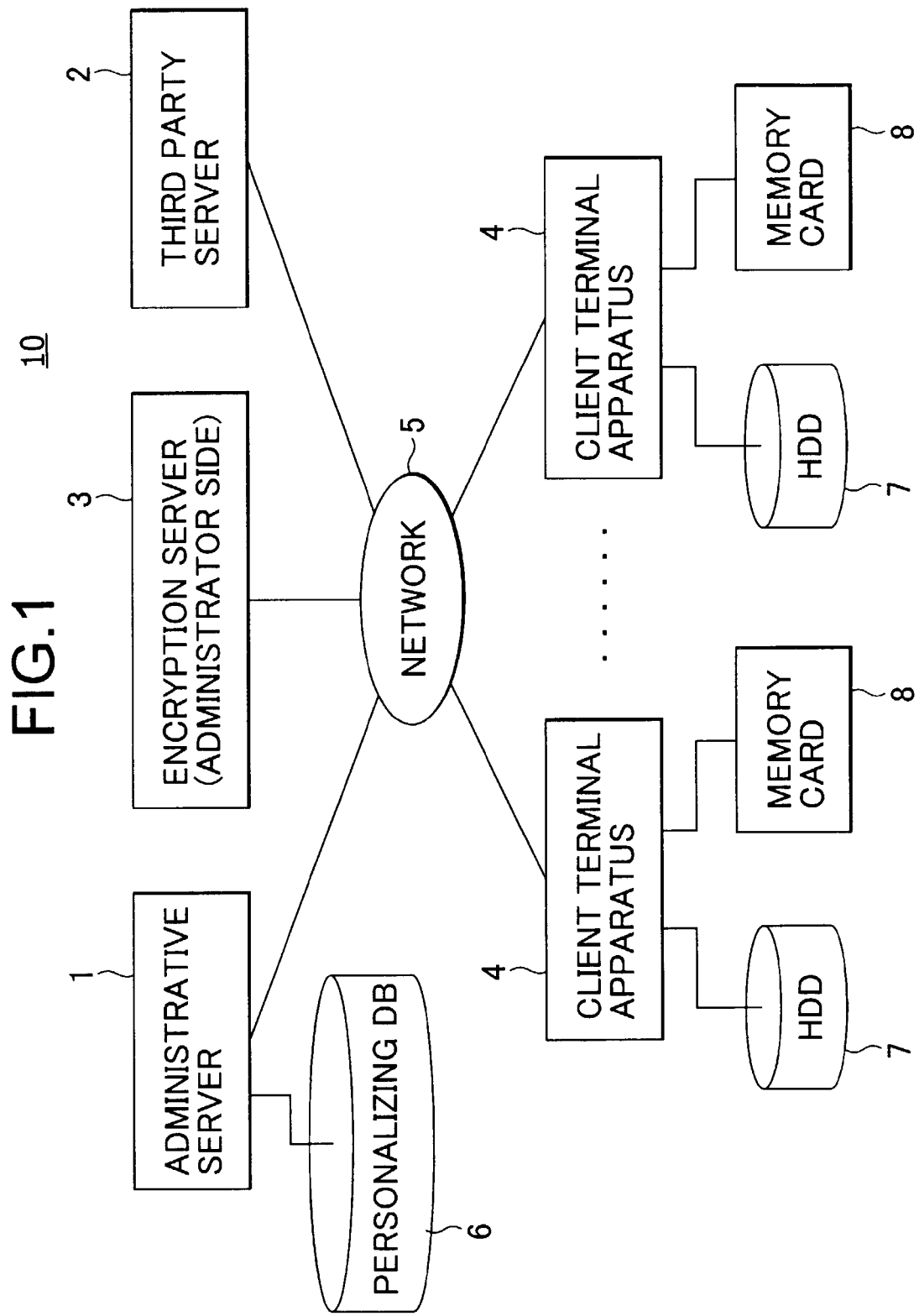
FIG. 1 is a block diagram of a system for distributing program content to one or more users in accordance with one or more aspects of the present invention.

With reference to the drawings, wherein like numerals indicate like elements, there is shown in FIG. 1 a system 10 that is operable to distribute program content to a plurality of end-users in a secure manner, e.g., such that unauthorized copies of the program content are either prevented or rendered useless. The system 10 preferably includes an administrative server 1, a third party server 2, an encryption server 3, and a plurality of client terminal apparatus 4, all coupled to a network 5, such as the Internet. It is noted that the system 10 may include a plurality of administrative servers 1, a plurality of third party servers 2, and a plurality of encryption servers 3 without departing from the scope of the invention. For brevity and clarity, only one of each such servers will be described in detail herein.

Each of the servers 1, 2, 3 is preferably maintained by, controlled by, and/or otherwise associated with an entity or person. It is noted that reference may be made herein to the server and the entity associated therewith interchangeably.

The administrative server 1, which is preferably operably coupled to a personalizing database 6, is preferably maintained by, controlled by, and/or otherwise associated with an entity charged with performing certain administration functions (which will be discussed in greater detail later in this description). The administrative server 1 and personalizing database 6 may be implemented utilizing any of the known (or hereinafter developed) hardware suitable for carrying out network server functions and database functions.

The third party server 2 is preferably controlled by, maintained by, and/or otherwise associated with an entity other than that of the administrative server 1, such as a developer of program content. By way of example, the third party server 2 may be a developer of computer application programs, computer system programs, etc. It is noted, however, that the entity associated with the third party server 2 need not be different than that of the administrative server 1, indeed they may be the same. For example, the functions carried out by the third party server 2 (which will be discussed in more detail later in this description), may be carried out by the administrative server 1. The third party server 2 may be implemented utilizing any of the known (or hereinafter developed) hardware for carrying out server related functions.

The encryption server 3 is preferably controlled by, maintained by, and/or otherwise associated with the same entity as that of the administrative server 1. It is noted, however, that the encryption server 3 may be associated with another entity without departing from the scope of the invention. The encryption server 3 may be implemented utilizing any of the known (or hereinafter developed) hardware for carrying out server related functions. As will become evident from the description herein, the respective functions carried out by the administrative server 1, the third party server 2, and the encryption server 3 may be distributed among one or more servers and/or one or more entities controlling, maintaining, and/or being otherwise associated with those servers, although such distribution is preferably consistent with that illustrated in FIG. 1.

Generally, each of the client terminal apparatus 4 is preferably operably coupled to a hard disk drive 7, such as any of the known hard disk drive hardware, and a memory card 8, such as the Sony Memorystick. While the hard disk drive 7 and memory card 8 (which is preferably removably coupled to the client terminal apparatus 4) are shown as separate items from the apparatus 4, it is understood that they may be integrally located with the apparatus 4 without departing from the spirit and scope of the invention. The client terminal apparatus 4 may be implemented utilizing any of the known hardware, such as a personal computer, the Sony PlayStation 2, etc.

In accordance with one or more aspects of the present invention, the client terminal apparatus 4 is preferably operable to receive a source encrypted program, such as a computer application program, by way of a storage media, such as a CD-ROM, DVD-ROM, electronic memory, etc., or by way of downloading the program content over the network 5. While the source encrypted computer program may be obtained from any authorized entity without departing from the spirit and scope of the invention, it is preferred that the client terminal apparatus 4 receives the source encrypted computer program from the third party server 2 (e.g., by way of downloading over the network 5) or from a brick-and-mortar distributor working in direct and/or indirect association with the software developer and/or the third party server 2. Again, it is not required that the client terminal apparatus 4 receive the source encrypted computer program from a particular entity; indeed, it may be received from the administrative server 3 or another entity.

Advantageously, the end-user receives the computer program in a form (i.e., source encrypted) in which he or she cannot execute the program on the client terminal apparatus 4 without first obtaining a decryption key and decrypting the source encrypted computer program. Further, if the source encrypted computer program is obtained by way of an authorized copy thereof, the offending end-user would be incapable of executing the program without first obtaining the decryption key. As will be discussed in more detail below, the decryption key may only be obtained by an authorized client terminal apparatus 4.

Figure 2:
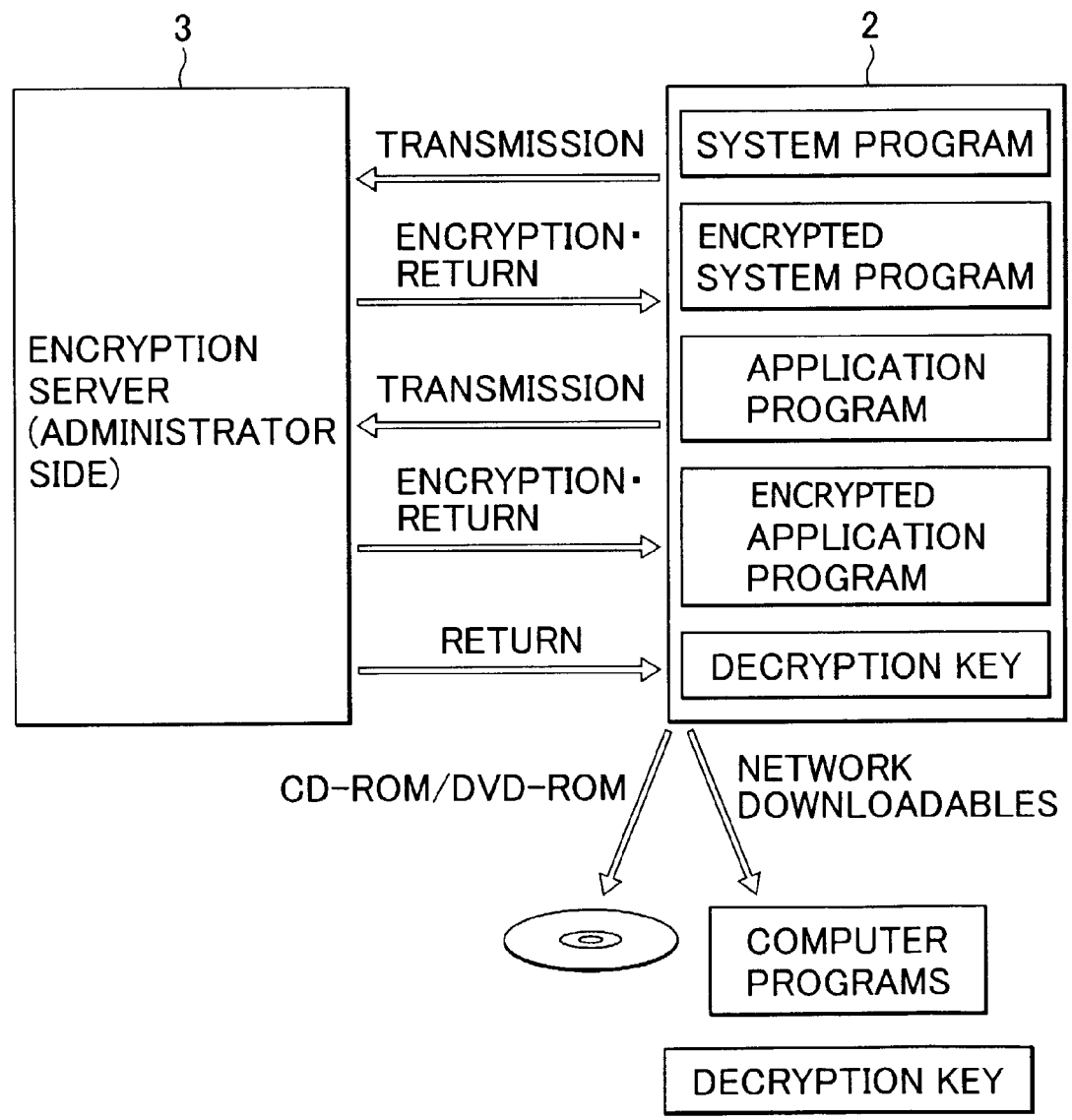
FIG. 2 is a conceptual block diagram and flow diagram illustrating certain process steps that are carried out by certain portions of the system of FIG. 1.

Reference is now made to FIG. 2, which is a conceptual block diagram and flow diagram illustrating certain process steps performed by the encryption server 3 and the third party server 2. This figure provides an example of how the source encrypted computer program is generated. In this example, the third party server 2 is associated with a software developer, that either itself or in conjunction with another entity obtains program content, such as a computer system program, a computer application program, etc. As shown in FIG. 2, the third party server 2 contains at least one system program and at least one application program. One or more of these programs are transmitted to the encryption server 3 over the network 5. It is noted, however, that the program content may be manually provided to the encryption server 3, e.g., by way of storage media.

The encryption server 3 preferably encrypts the program content and returns the encrypted program content to the third party server 2. The encryption process may employ any of the known encryption techniques, such as public key encryption, symmetric key encryption, etc., in order to produce the encrypted program content. In this example, the encryption server 3 has returned an encrypted system program (a source encrypted system program) and an encrypted application program (a source encrypted application program) to the third party server 2. Although it is not required to practice the invention, the encryption server 3 may provide the decryption key, which is capable of decrypting the encrypted program content, to the third party server 2. As will be discussed hereinbelow, the third party server 2 may distribute the encrypted program content to the client terminal apparatus 4 manually by way of storage media, or by way of an electronic download over the network 5. Irrespective of how the source encrypted program content is distributed, the end-user preferably cannot execute the program content without performing certain registration steps, which will be discussed hereinbelow.

Figure 3:
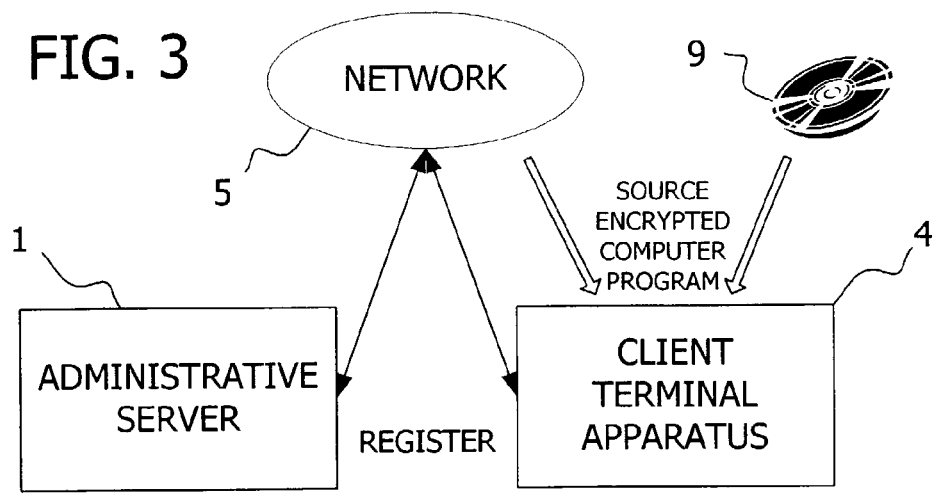
FIG. 3 is a further conceptual block diagram and flow diagram illustrating further steps that are carried out by certain portions of the system of FIG. 1.

Reference is now made to FIG. 3, which is a conceptual block diagram and flow diagram illustrating certain process steps that are preferably carried out in order to process the source encrypted computer program. As shown in FIG. 3, the client terminal apparatus 4 has preferably received the source encrypted computer program either by way of a downloading operation over the network 5 or by way of a storage medium, such as a CD-ROM 9. In order to execute the source encrypted computer program, however, the client terminal apparatus 4 must register the source encrypted computer program, preferably with the administrative server 1 over the network 5.

Figure 4:
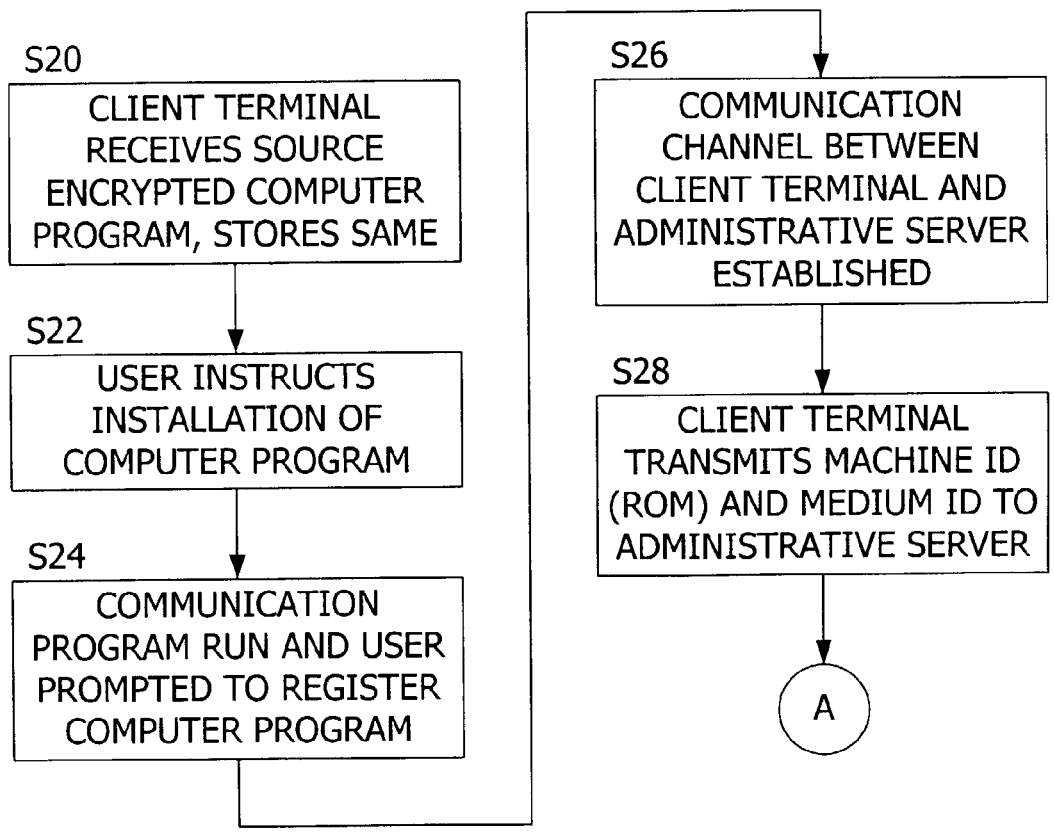
FIG. 4 is a flow diagram showing certain process steps carried out in accordance with the invention as illustrated in FIG. 3.

At least some of the steps in the registration process are illustrated in the flow diagram of FIG. 4. At step S20, the client terminal apparatus 4 receives the source encrypted computer program and stores same as discussed hereinabove. At step S22, the user preferably provides an instruction indicating that he or she wishes to install the computer program and make it ready for execution. In this regard, the client terminal apparatus 4 preferably includes a computer program that is invoked in response to the user's installation instruction. This program prompts the user to register the source encrypted computer program and invokes, a communication feature (step S24).

It is noted that the client terminal apparatus 4 preferably includes a network interface, which is operable to provide communications over the network 5 as is known in the art; indeed, any of the known network interface hardware may be employed for this purpose. At step S26, a channel of communication is preferably initiated by the client terminal apparatus 4 and established between the apparatus 4 and the administrative server 1. The network interface of the client terminal apparatus 4 is preferably operable to facilitate the transmission of at least some identification information related to the apparatus 4 to the administrative server 1 over the network 5. In particular, the identification information preferably includes a machine ID that is substantially unique to the client terminal apparatus 4. The identification information may also include a medium ID, which indicates a type of memory employed by the client terminal apparatus 4 to store the source encrypted computer program.

It is most preferred that the client terminal apparatus 4 include a first storage device, such as the hard disk drive 7, the memory card 8, etc. operable to store the source encrypted computer program and certain other information that will be discussed hereinbelow, and a second storage device, such as a read only memory (ROM) that is operable to store the machine ID. The network interface of the client terminal apparatus 4 is preferably further operable to transmit the machine ID (from the ROM) over the network 5 to the administrative server 1 (action S28). The medium ID may also be transmitted from the client terminal apparatus 4 to the administrative server 1.

Figure 5:
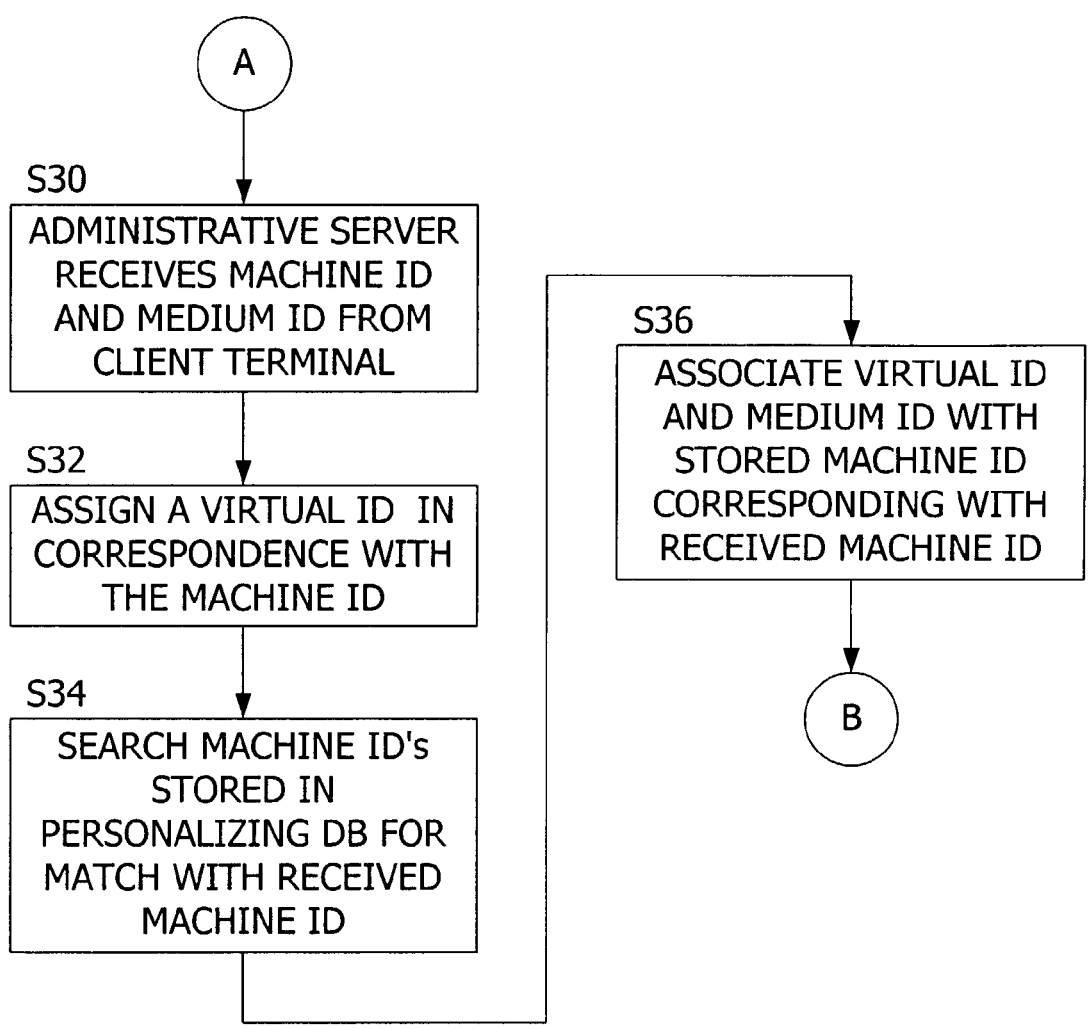
FIG. 5 is a further flow diagram illustrating certain process steps carried out by, for example, the administrative server 1 of FIG. 1.

With reference to FIG. 5, the administrative server 1 receives the identification information, e.g., the machine ID (and possibly the medium ID) from the client terminal apparatus 4 over the network 5 (step S30). In this regard, the administrative server 1 preferably includes a network interface operable to facilitate communication with the network 5 such that the identification information may be received over the network 5 from the client terminal apparatus 4. At step S32, the administrative server 1 assigns another ID, called a virtual ID herein, that corresponds with the machine ID received from the client terminal apparatus 4. It is noted that the virtual ID may be selected from a plurality of preexisting IDs, the virtual ID may be derived through numeric operations performed on the machine ID or some other operand, or any other known or hereinafter developed technique may be employed to generate the virtual ID.

Figure 6:
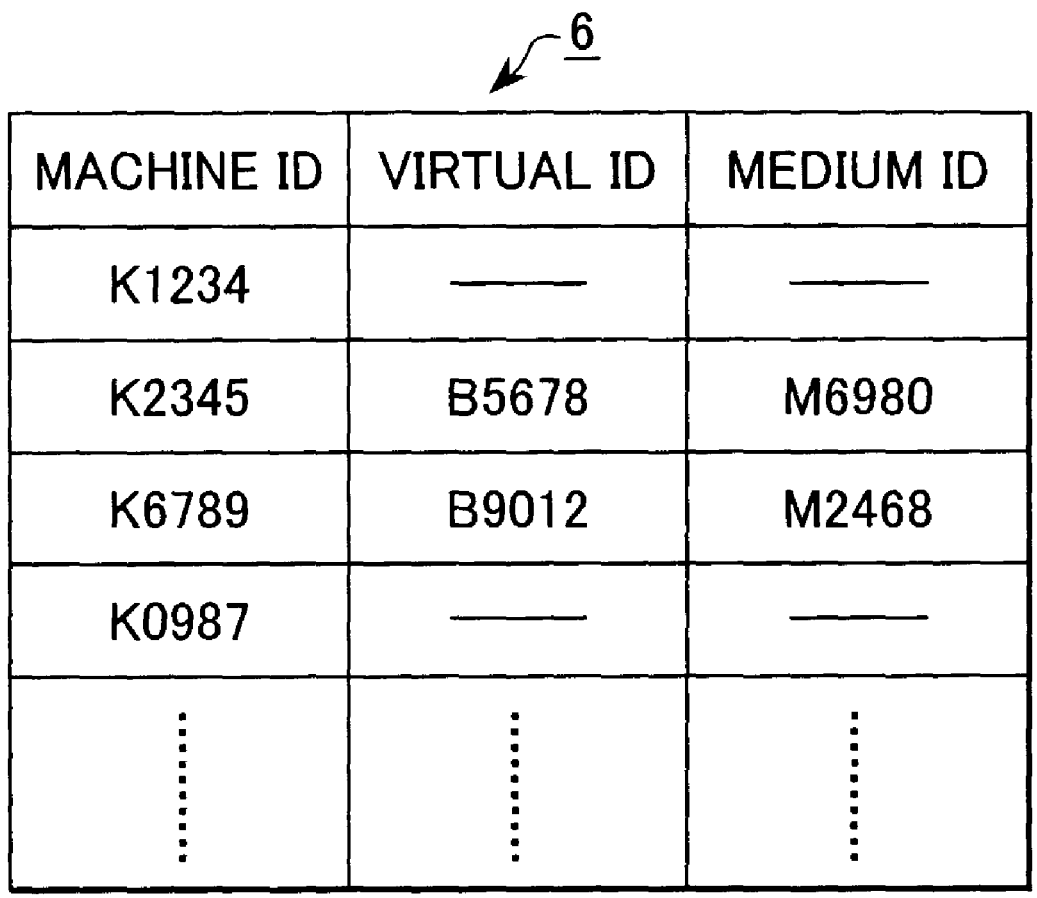
FIG. 6 is a block diagram illustrating certain database content in accordance with the present invention.

At step S34, the administrative server 1 searches the personalizing database 6 for an existing machine ID that matches the machine ID received from the client terminal apparatus 4 (i.e., the machine ID stored in the second storage device (ROM) thereof). With reference to FIG. 6, the personalizing database 6 is preferably operable to store respective registration information, each set of registration information corresponding with a respective one of the client terminal apparatus 4. At least some identification information of the client terminal apparatus 4 is included in the registration information, such as the machine ID. As illustrated in FIG. 6, a plurality of machine IDs are pre-stored in the personalizing database 6, as shown in the left column of FIG. 6. It is preferred that each of these machine IDs corresponds with a given one of the client terminal apparatus 4 and that such machine IDs are substantially unique to the respective client terminal apparatus 4. The administrative server 1 also preferably includes a data processor operable to search the personalizing database 6 for the registration information (e.g., the machine ID) that matches the machine ID received from the client terminal apparatus 4 over the network 5. Any of the known or hereinafter developed data processing hardware may be employed for this purpose.

Turning again to FIG. 5, at step S36, the virtual ID is associated with the machine ID stored in the personalizing database 6, which is to say that the virtual ID is associated with the particular client terminal apparatus 4 that transmitted the received machine ID to the administrative server 1. This association is preferably achieved by storing the virtual ID within the personalizing database 6 in a manner such that it corresponds with the stored machine ID. For example, if the received machine ID from the client terminal apparatus 4 were K2345 and the generated virtual ID were B5678, then the association of the virtual ID B5678 with the machine ID K2345 may be achieved by storing the virtual ID B5678 in a position within the personalizing database 6 that corresponds with (or is linked to) the stored machine ID K2345. Similarly, if the received machine ID were K6789 and the generated virtual ID were B9012, then the association of the virtual ID B9012 with the machine ID K6789 may be achieved by storing the virtual ID B9012 in a position within the personalizing database 6 that is associated with the machine ID K6789.

As noted above, the identification information transmitted from the client terminal apparatus 4 to the administrative server 1 over the network 5 (step S28, FIG. 4) may include the transmission of a medium ID (or media ID) that corresponds with the type of storage device employed by the client terminal apparatus 4 to store the source encrypted computer program. For example, the medium ID may indicate that the client terminal apparatus 4 stores the source encrypted computer program in a hard disk drive 7, in a memory card 8, or in some other type of storage medium. In response, the administrative server 1 may associate the virtual ID with the stored machine ID and the received medium ID by storing the received medium ID in the personalizing database 6 at a position that corresponds with the stored machine ID. By way of example, the stored machine ID K2345 is associated with the virtual ID B5678 and with a received medium ID of M6980. Similarly, the machine ID K6789 is associated with the virtual ID B9012 and the medium ID M2468. It is noted that the "- -" in the virtual ID and medium ID positions opposite machine ID K1234 and K0987 indicate that the corresponding client terminal apparatus 4 have not yet been purchased by end-users or that such end-users have not yet registered computer programs with the administrative server 1.

Figure 7:
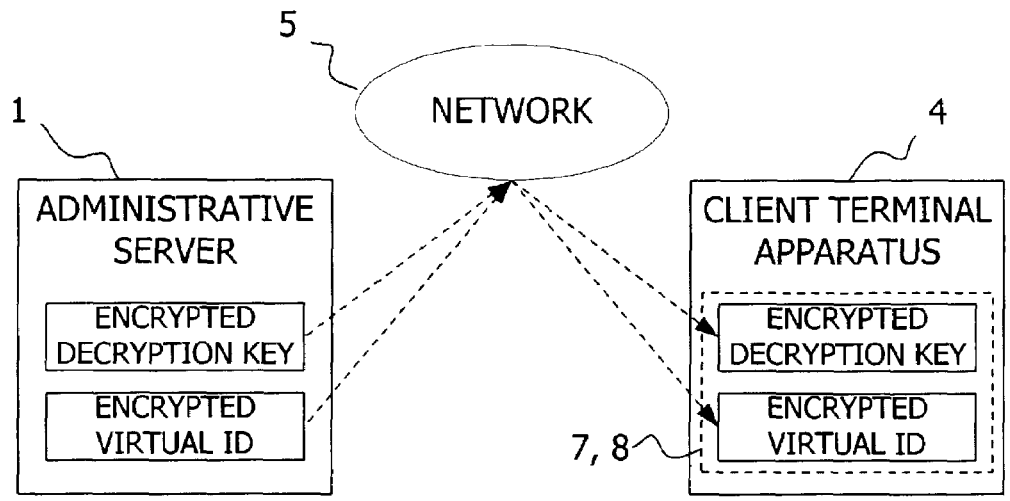
FIG. 7 is a further conceptual block diagram and flow diagram illustrating certain process steps carried out by portions of the system of FIG. 1.
Figure 8:
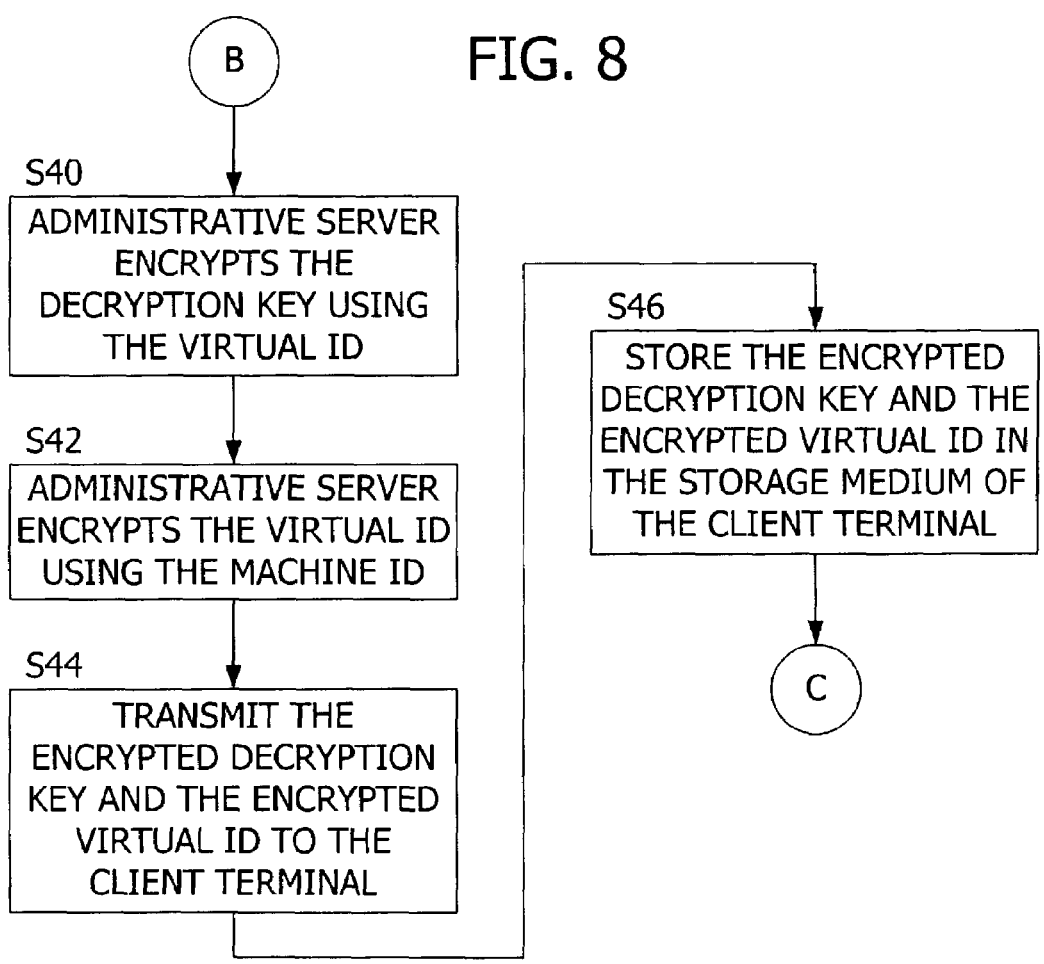
FIG. 8 is a flow diagram illustrating further process steps carried out in accordance with FIG. 7.

With reference to FIGS. 7 and 8, the administrative server 1 is preferably operable to produce an encrypted decryption key and an encrypted virtual ID, where the decryption key is operable for use in decrypting the source encrypted computer program at the client terminal apparatus 4. It is noted that the administrative server 1 may have access to any number of decryption keys that may be used to decrypt respective source encrypted computer programs produced by the encryption server 3 (FIGS. 1-2). These decryption keys may be provided to the administrative server 1 by the encryption server 3 and/or by the third party server 2. Furthermore, these decryption keys may be transmitted to the administrative server 1 by way of the network 5, by way of another network, or may be manually provided by way of storage media, etc.

At step S40, the administrative server 1 preferably encrypts the decryption key using the virtual ID associated with the client terminal apparatus 4. Further, the administrative server 1 preferably encrypts the virtual ID using the associated machine ID of the client terminal apparatus 4, each of which is preferably obtained from the personalizing database 6 (step S42).

The network interface of the administrative server 1 is preferably further operable to facilitate the transmission of the encrypted decryption key and the encrypted virtual ID to the client terminal apparatus 4 over the network 5 (step S44). At step S46, the client terminal apparatus 4 preferably receives the encrypted decryption key and the encrypted virtual ID over the network 5 and stores same in the first storage device (e.g., the hard disk drive 7, the memory card 8, etc.).

Advantageously, the encrypted decryption key is only provided to an authorized client terminal apparatus 4, e.g., a client terminal apparatus 4 that has provided a valid machine ID and has registered such machine ID in association with a virtual ID used to encrypt the decryption key. Furthermore, any interception of the encrypted decryption key, such as by way of network piracy or unauthorized duplication, will fail to provide the necessary information (i.e., a usable decryption key) to decrypt the source encrypted computer program. Indeed, such decryption key is encrypted with a substantially unique virtual ID. Similarly, the encrypted virtual ID is provided to the client terminal apparatus 4 only after the registration process has been completed and the client terminal apparatus 4 has been deemed authorized. As the virtual ID is transmitted from the administrative server 1 to the client terminal apparatus 4 in an encrypted manner (i.e., encrypted using the machine ID of the client terminal apparatus 4), any unauthorized acquisition of the encrypted virtual ID will not yield the necessary information to decrypt the encrypted decryption key.

Figure 9:
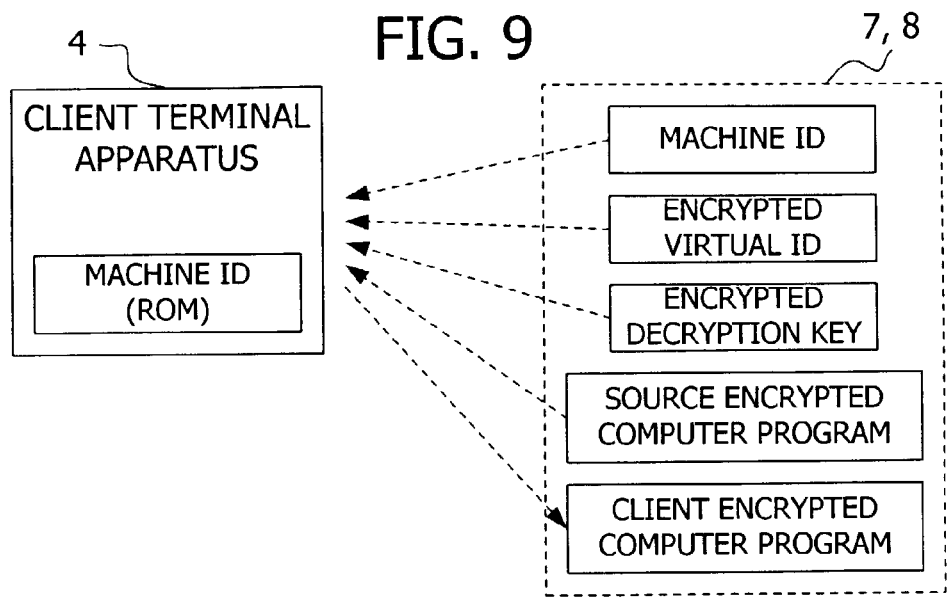
FIG. 9 is a further conceptual block diagram and flow diagram illustrating one or more further process steps carried out by, for example, the client terminal apparatus 4 of FIG. 1.
Figure 10:
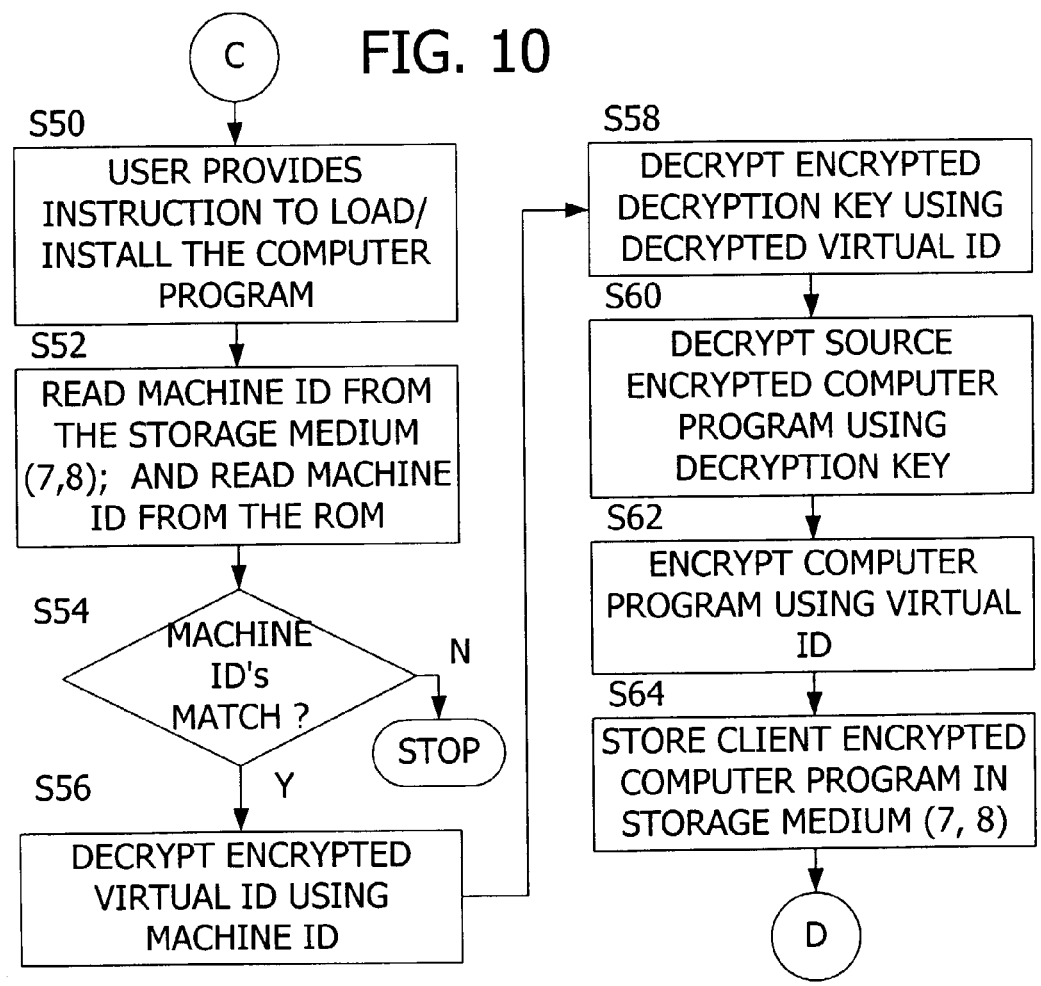
FIG. 10 is a flow diagram illustrating further process steps carried out in accordance with FIG. 9.

Reference is now made to FIGS. 9 and 10, which illustrate certain processes that are carried out in order to load/install the source encrypted computer program within the client terminal apparatus 4. FIG. 9 illustrates that the client terminal apparatus 4 is separate from the first storage device, e.g., the hard disk drive 7, the memory card 8, etc. As discussed above, however, these elements may be integrated or semi-integrated without departing from the spirit and scope of the invention as claimed. It is noted that at this stage of the process, the client terminal apparatus 4 includes the machine ID stored in the second storage device, e.g., the ROM, and the first storage device 7, 8 contains the following items: the machine ID, the encrypted virtual ID, the encrypted decryption key, and the source encrypted computer program.

At step S50, the user may provide an instruction to the client terminal apparatus 4 to load/install the source encrypted computer program for future use. In response, the client terminal apparatus 4, using appropriate hardware and software processes, reads the machine ID from the first storage device 7, 8 and reads the machine ID from the second storage device, e.g., the ROM (step S52). At step S54, a determination is made as to whether these machine IDs match. If they do not, then the process terminates and/or enters an alternative process. If they match, however, the process flow advances to step S56, where the encrypted virtual ID is decrypted using the machine ID (preferably the machine ID that was stored in the ROM). Once the virtual ID is obtained, the encrypted decryption key is decrypted using the virtual ID (step S58). Next, the source encrypted computer program is decrypted using the decryption key (step S60). At step S62, the computer program is re-encrypted using the virtual ID obtained at step S56 to obtain a client encrypted computer program. The client encrypted computer program is stored in the first storage device 7, 8 (step S64). At this stage, neither the encrypted decryption key nor the source encrypted computer program need be retained in the first storage device 7, 8.

The client terminal apparatus 4 preferably includes a decryption device and an encryption device in order to execute the encryption and decryption functions discussed hereinabove. The decryption device and the encryption device may be integrated together and, for simplicity referred to as a decryption device. Any of the known or hereinafter developed hardware and/or software for performing such encryption and decryption may be employed in accordance with the invention. For example, a decryption library, an encryption library, etc., may be employed.

Advantageously, the client encrypted computer program is secure because (as will be explained hereinbelow) unauthorized copies thereof cannot be executed by unauthorized end-users on different client terminal apparatus 4. Indeed, the client encrypted computer program must first be decrypted, which as will be explained hereinbelow cannot be performed on any other client terminal apparatus 4 other than the one that registered the computer program with the administrative server 1.

Figure 11:
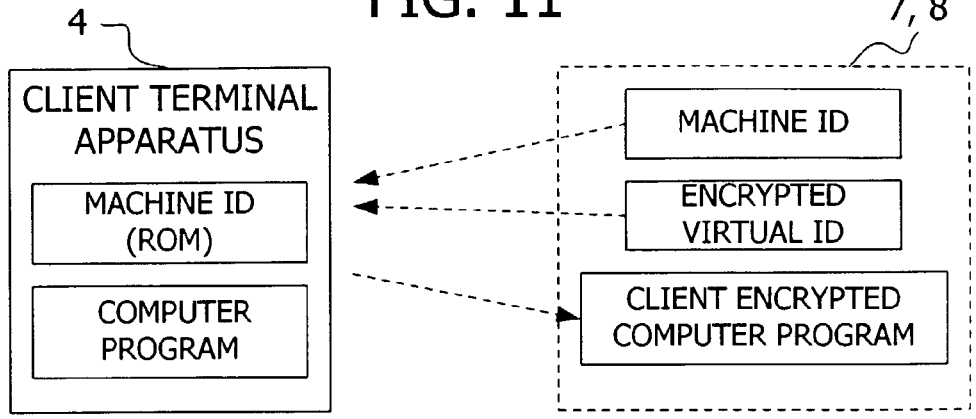
FIG. 11 is a conceptual block diagram and flow diagram illustrating further process steps carried out in accordance with certain aspects of the present invention.
Figure 12:
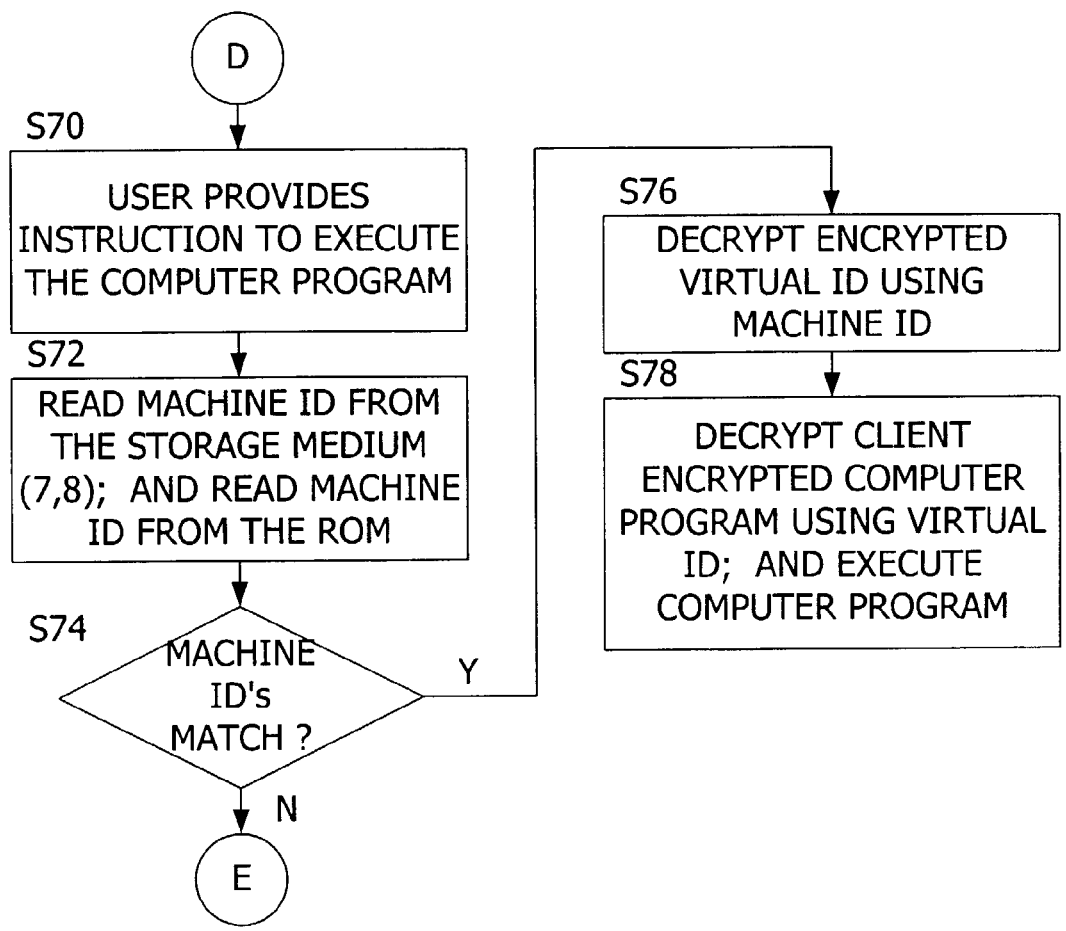
FIG. 12 is a flow diagram illustrating further details concerning the process steps of FIG. 11.

With reference to FIGS. 11 and 12, the process by which the computer program is executed by the client terminal apparatus 4 will now be discussed. At this stage in the process, the client terminal apparatus 4 includes the second storage device, e.g., the ROM, containing the machine ID and the first storage device 7, 8 containing the machine ID, the encrypted virtual ID, and the client encrypted computer program.

At step S70, the user may provide an instruction to the client terminal apparatus 4 to execute the computer program. In response, the client terminal apparatus, operating under the control of an appropriate computer program, reads the machine ID from the first storage device 7, 8 and reads the machine ID from the second storage device (ROM) (step S72). At step S74 a determination is made as to whether the machine IDs match one another. If not, the process flow advances to a re-registration process that will be discussed in more detail hereinbelow with respect to FIGS. 17-20. If the machine IDs match, the process flow advances to step S76, where the decryption device of the client terminal apparatus 4 decrypts the encrypted virtual ID using the machine ID (preferably the machine ID that is contained in the ROM). At step S78, the decryption device of the client terminal apparatus 4 decrypts the client encrypted computer program using the virtual ID obtained at step S76. At this point, the client terminal apparatus 4 may execute the computer program, which is resident in RAM.

Advantageously, the client encrypted computer program may only be decrypted using the client terminal apparatus 4 that is associated with the virtual ID used to encrypt the client encrypted computer program. Thus, if unauthorized copies of the client encrypted computer program are provided to non-authorized end-users, the apparatus on which such unauthorized end-users would attempt to execute the computer program would not be capable of decrypting the client encrypted computer program. Further, if the first storage device 7, 8 were provided to an unauthorized enduser (e.g., such that the storage device 7, 8 were coupled to a different client terminal apparatus 4), the encrypted virtual ID could not be decrypted inasmuch as any machine ID stored in ROM would not match the machine ID contained in the first storage device 7, 8. Thus, the client encrypted computer program could not be decrypted. This novel approach to the secure distribution of computer programs ensures that unauthorized copies of the computer program are rendered useless and that only a particular client terminal apparatus 4 is capable of executing the computer programs.

As discussed above, the computer program may be an application program, such as a video game, a word processing program, a spread sheet, etc. or the computer program may be a system program, such as an operating system (OS), boot program, etc.

Figure 13:
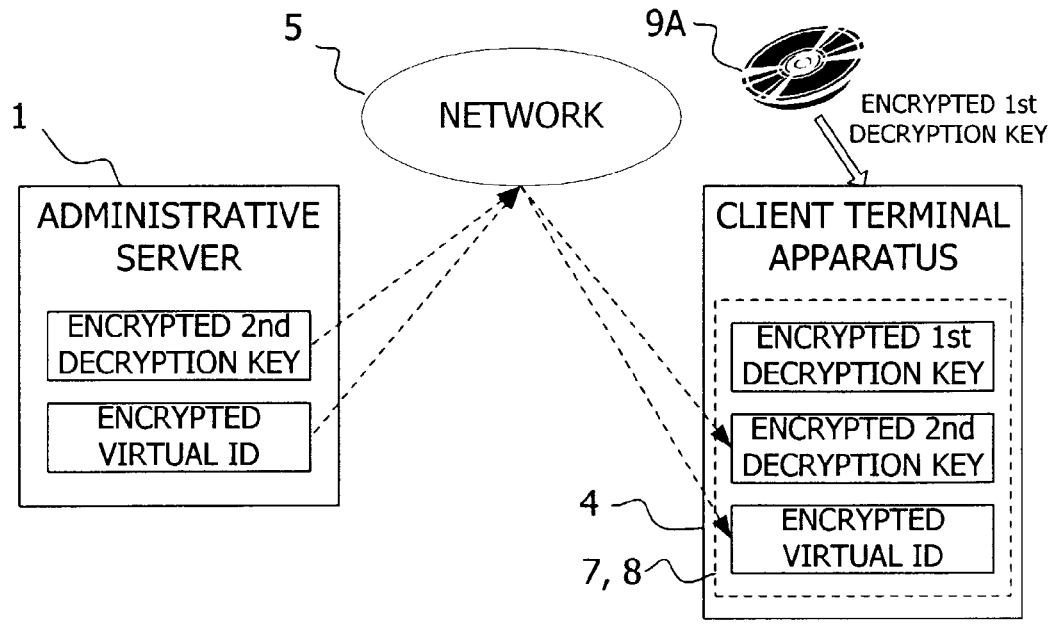
FIG. 13 is a conceptual block diagram and flow diagram illustrating alternative process steps that may be carried out in accordance with one or more aspects of the present invention.
Figure 14:
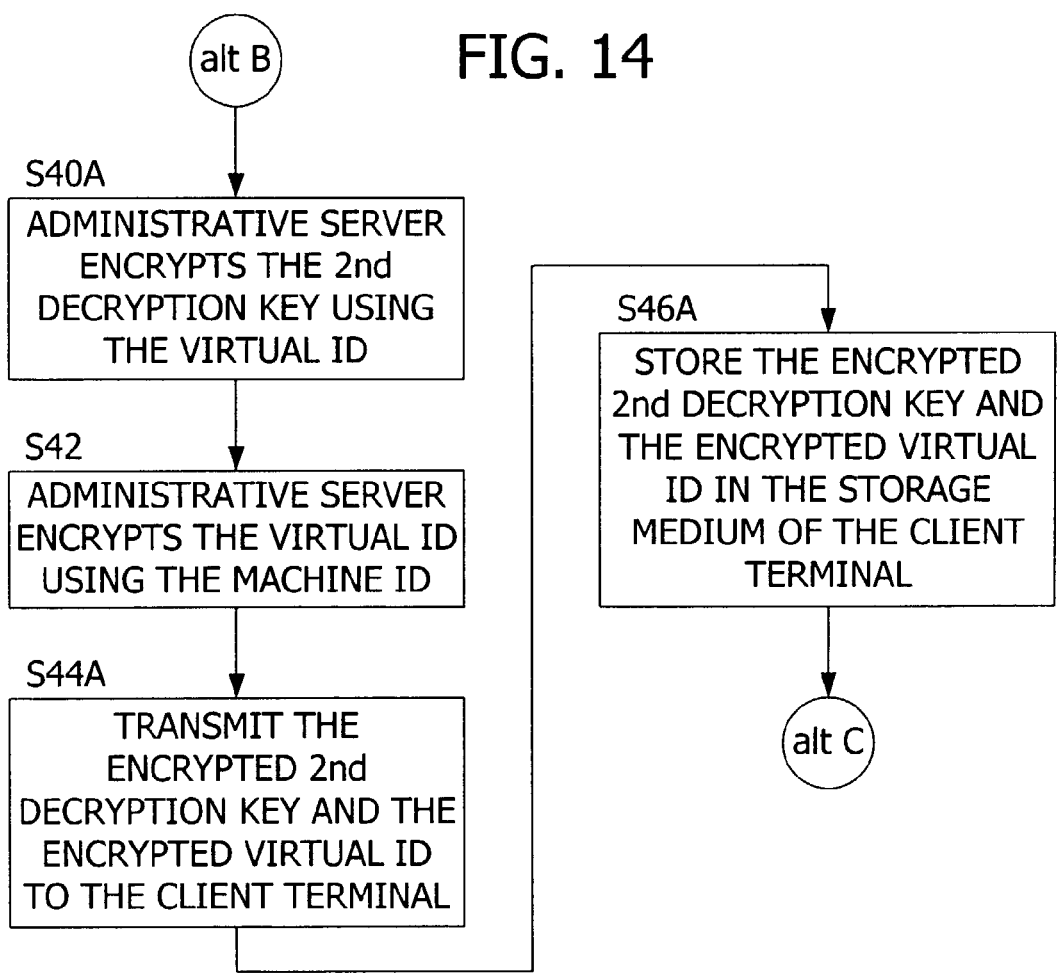
FIG. 14 is a flow diagram illustrating further details concerning the process steps of FIG. 13.

While the aspects of the invention discussed above contemplate that the decryption key is provided to the client terminal apparatus 4 over the network 5, alternative aspects of the invention contemplate that the decryption key may be provided to the client terminal apparatus 4 by way of a storage medium (e.g., a CD-ROM, etc.) for manual distribution. These aspects of the present invention will now be described with reference to FIGS. 13 and 14. As shown in FIG. 13, the client terminal apparatus 4 receives an encrypted first decryption key by way of a storage medium 9A. The first decryption key is preferably operable for use in decrypting the source encrypted computer program at the client terminal apparatus 4. The administrative server 1 is preferably operable to produce an encrypted second decryption key and an encrypted virtual ID, where the second decryption key is operable for use in decrypting the encrypted first decryption key. It is noted that the administrative server 1 may have access to any number of second decryption keys that may be used to decrypt respective encrypted first decryption keys. These second decryption keys may be provided to the administrative server 1 by the encryption server 3 and/or by the third party server 2. Furthermore, these second decryption keys may be transmitted to the administrative server 1 by way of the network 5, by way of another network, or may be manually provided by way of storage media, etc.

At step S40A, the administrative server 1 preferably encrypts the second decryption key using the virtual ID associated with the client terminal apparatus 4. Further, the administrative server 1 preferably encrypts the virtual ID using the associated machine ID of the client terminal apparatus 4, each of which is preferably obtained from the personalizing database 6 (step S42). The network interface of the administrative server 1 is preferably further operable to facilitate the transmission of the encrypted second decryption key and the encrypted virtual ID to the client terminal apparatus 4 over the network 5 (step S44A). At step S46A, the client terminal apparatus 4 preferably receives the encrypted second decryption key and the encrypted virtual ID over the network 5 and stores same in the first storage device (e.g., the hard disk drive 7, the memory card 8, etc.).

Advantageously, the encrypted second decryption key is only provided to an authorized client terminal apparatus 4, e.g., a client terminal apparatus 4 that has provided a valid machine ID and has registered such machine ID in association with a virtual ID used to encrypt the second decryption key. Any interception of the encrypted second decryption key, such as by way of network piracy or unauthorized duplication, will fail to provide the necessary information (i.e., a usable second decryption key) to decrypt the encrypted first decryption key. Indeed, such second decryption key is encrypted with a substantially unique virtual ID. Similarly, the encrypted virtual ID is provided to the client terminal apparatus 4 only after the registration process has been completed and the client terminal apparatus 4 has been deemed authorized. As the virtual ID is transmitted from the administrative server 1 to the client terminal apparatus 4 in an encrypted manner (i.e., encrypted using the machine ID of the client terminal apparatus 4), any unauthorized acquisition of the encrypted virtual ID will not yield the necessary information to decrypt the encrypted second decryption key.

Figure 15:
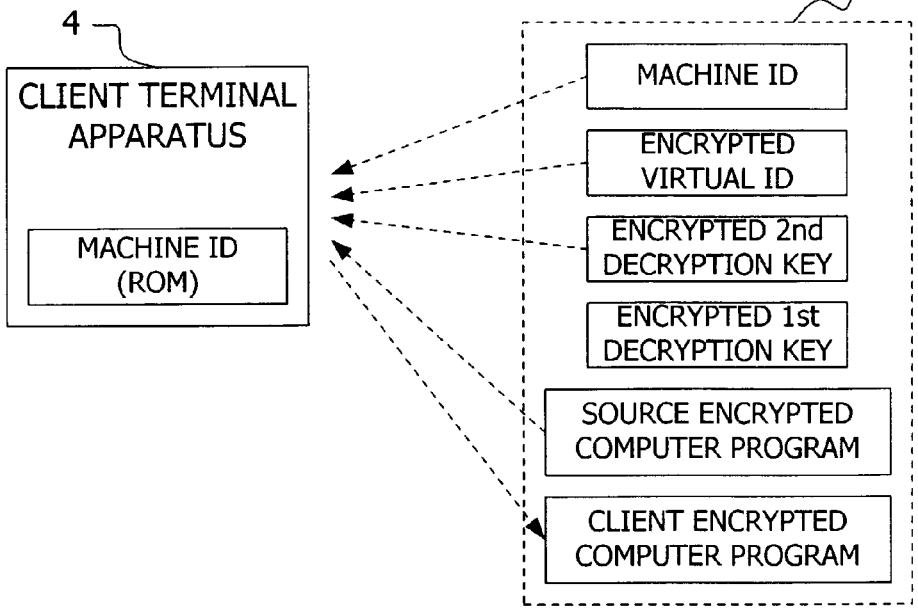
FIG. 15 is a conceptual block diagram and flow diagram illustrating further process steps in accordance with the alternative concept of FIG. 13.
Figure 16:
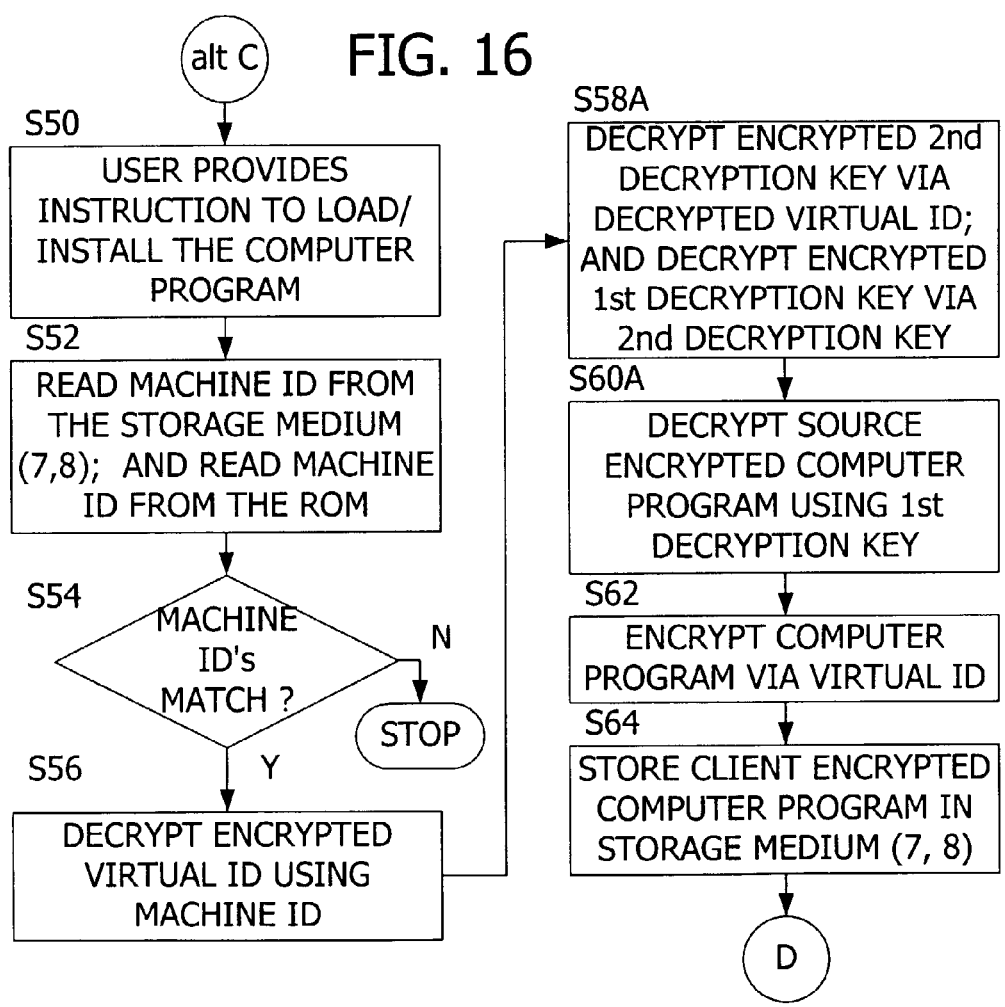
FIG. 16 is a flow diagram illustrating further details concerning the process steps of FIG. 15.

Reference is now made to FIGS. 15 and 16, which illustrate certain processes that are carried out in order to load/install the source encrypted computer program within the client terminal apparatus 4. FIG. 15 illustrates that at this stage of the process, the client terminal apparatus 4 includes the machine ID stored in the second storage device (ROM), and the first storage device 7, 8 contains the following items: the machine ID, the encrypted virtual ID, the encrypted second decryption key, the encrypted first decryption key, and the source encrypted computer program.

At step S50, the user may provide an instruction to the client terminal apparatus 4 to load/install the source encrypted computer program for future use. In response, the client terminal apparatus 4, using appropriate hardware and software processes, reads the machine ID from the first storage device 7, 8 and reads the machine ID from the second storage device, e.g., the ROM (step S52). At step S54, a determination is made as to whether these machine IDs match. If they do not, then the process terminates and/or enters an alternative process. If they match, however, the process flow advances to step S56, where the encrypted virtual ID is decrypted using the machine ID (preferably the machine ID that was stored in the ROM). Once the virtual ID is obtained, the encrypted second decryption key is decrypted using the virtual ID and the encrypted first decryption key is decrypted using the second decryption key (step S58A). Next, the source encrypted computer program is decrypted using the first decryption key (step S60A). At step S62, the computer program is re-encrypted using the virtual ID obtained at step S56 to obtain a client encrypted computer program. The client encrypted computer program is stored in the first storage device 7, 8 (step S64). At this stage, neither the encrypted first decryption key, the encrypted second decryption key, nor the sourced encrypted computer program need be retained in the first storage device 7, 8.

Once the client encrypted computer program is obtained and stored in the first storage device 7, 8, the process discussed hereinabove with respect to FIGS. 11 and 12 may be utilized to execute the computer program.

As discussed hereinabove with respect to FIGS. 11 and 12, when the user desires to execute the client encrypted computer program, a determination is made at step S74 as to whether the machine ID contained in the first storage device 7, 8 matches the machine ID stored in the second storage device (ROM) of the client terminal apparatus 4. If the machine IDs do not match, then the process flow branches to a re-registration process that will now be described with reference to FIG. 17.

It is noted that these machine IDs would not match if the client terminal apparatus 4 were improperly modified to connect with the storage device 7, 8 of a different client terminal apparatus 4. Alternatively, the machine IDs would be different if the client terminal apparatus 4 were repaired and the machine ID stored in the second storage device ROM were changed in accordance with the repair. Still further, these machine IDs would be different if a user were to replace his or her client terminal apparatus 4 with a new client terminal apparatus 4 for one reason or another and to retain the first storage device 7, 8, for example, because it contained one or more client encrypted computer programs. In any event, a re-registration (or updated registration) process is contemplated in accordance with the present invention because if the machine IDs do not match, the user would not be capable of executing the computer programs contained on the first storage device 7, 8 even if such computer programs were obtained in an authorized manner. Of course, the user could re-install the computer programs (assuming that they were readily available in their initial source encrypted form), however, this relatively difficult process can be avoided in accordance with the present invention.

Figure 17:
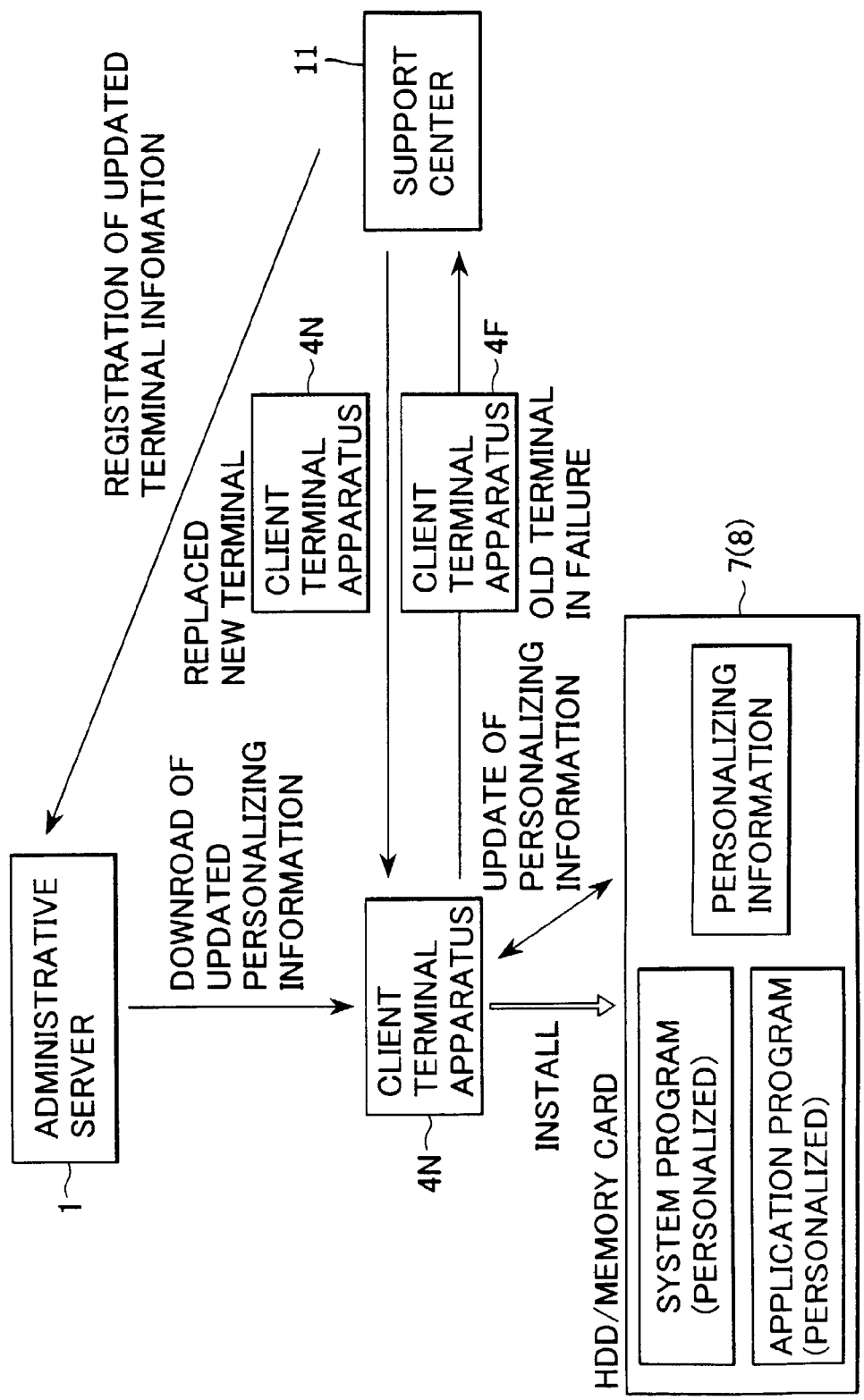
FIG. 17 is a conceptual block diagram and flow diagram illustrating further aspects of the present invention.

Before discussing the core details of FIG. 17, it is noted that the first storage device 7, 8 is shown as containing computer programs and data that are labeled slightly differently than in previous figures. In particular, the first storage device 7, 8 contains a personalized system program, a personalized application program, and personalizing information. It is noted that the personalized system program and personalized application program corresponds with the client encrypted computer program discussed hereinabove with respect to, for example, FIGS. 9, 11, and 15. The personalizing information corresponds with one or more of the machine ID, medium ID, encrypted virtual ID, etc.

Turning now to further details of FIG. 17, a process is illustrated in which an old or failed client terminal apparatus 4F is provided to a support center 11, where repairs or replacement is made and a new client terminal apparatus 4N is provided to the user. Preferably, the support center 11 transmits the old machine ID from the failed terminal apparatus 4F as well as the new machine ID from the new client terminal apparatus 4N to the administrative server 1.

With further reference to FIGS. 18 and 19, the administrative server 1 preferably receives the old machine ID from the failed terminal apparatus 4F as well as the new machine ID from the new client terminal apparatus 4N. The administrative server 1 then accesses the personalizing database 6 and searches for the machine ID of the old client terminal apparatus 4N, e.g., machine ID K6789 in order to obtain the associated virtual ID B9012 (and possibly the medium ID M2468). Next, the machine IDs stored in the personalizing database 6 are searched to find the new machine ID K1143 of the new client terminal apparatus 4N. Next, the virtual ID B9012 associated with the old machine ID K6789 is associated with the new machine ID K1143 (and the old medium ID may also be associated therewith). A this stage in the process, the administrative server 1 is ready for the user to update his or her registration information.

Figure 20:
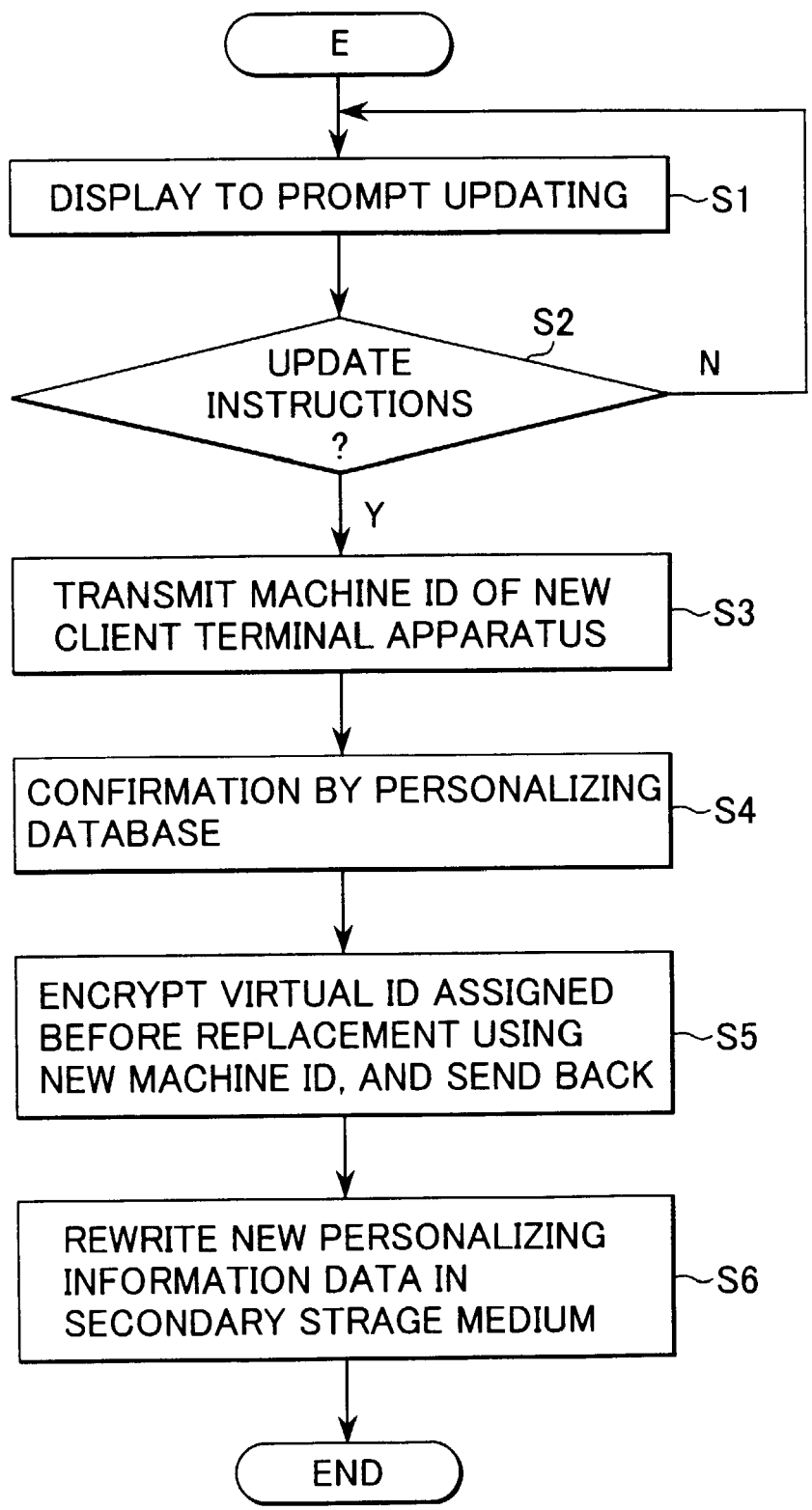
FIG. 20 is a flow diagram illustrating further details of the process steps of FIG. 17.

Recall that when a user instructs the client terminal apparatus 4N to execute a computer program residing in the first storage device 7, 8, a determination is made as to whether the respective machine IDs stored in the first storage device 7, 8 and the second storage device (ROM) match (steps S70-S74, FIG. 12). With further reference to FIG. 20, when it is determined that the machine IDs do not match (step S74, FIG. 12) the user is preferably prompted to update his or her registration information with the administrative server 1 (step S1). At step S2, a determination is made as to whether the user has instructed the client terminal apparatus 4 to execute the registration update process. If such instructions have not been received, then the process flow preferably loops back to step S1, where the user is again prompted to update the registration information. Once the user has provided instructions to update the registration information, the process preferably advances from step S2 to step S3, where the machine ID contained in the second storage device (ROM) of the new client terminal apparatus 4N is transmitted (by way of the network interface thereof) to the administrative server 1 over the network 5. At step S4, the administrative server confirms this information by way of accessing the personalizing database 6. Thereafter, the old virtual ID (which was originally associated with the old client terminal apparatus 4F) is encrypted utilizing the new machine ID (K1143) and transmitted (e.g., by way of the network interface of the administrative server 1) to the new client terminal apparatus 4N over the network 5.

At step S6, the new client terminal apparatus 4N receives the new encrypted virtual ID (personalizing information data) and stores same in the first storage device 7, 8, preferably in a way that replaces the encrypted old virtual ID. This completes the registration update process.

Advantageously, the client encrypted computer program, which was originally utilized by way of the failed client terminal apparatus 4F may be decrypted utilizing the new encrypted virtual ID because the new encrypted virtual ID contains the same virtual ID as the old encrypted virtual ID. Stated another way, the only difference between the old encrypted virtual ID and the new encrypted virtual ID is the machine ID used to encrypt the virtual ID. In order for the user to execute the client encrypted computer program on the new client terminal apparatus 4N, the process steps discussed hereinabove with respect to FIGS. 11 and 12 may be performed.

Figure 21:
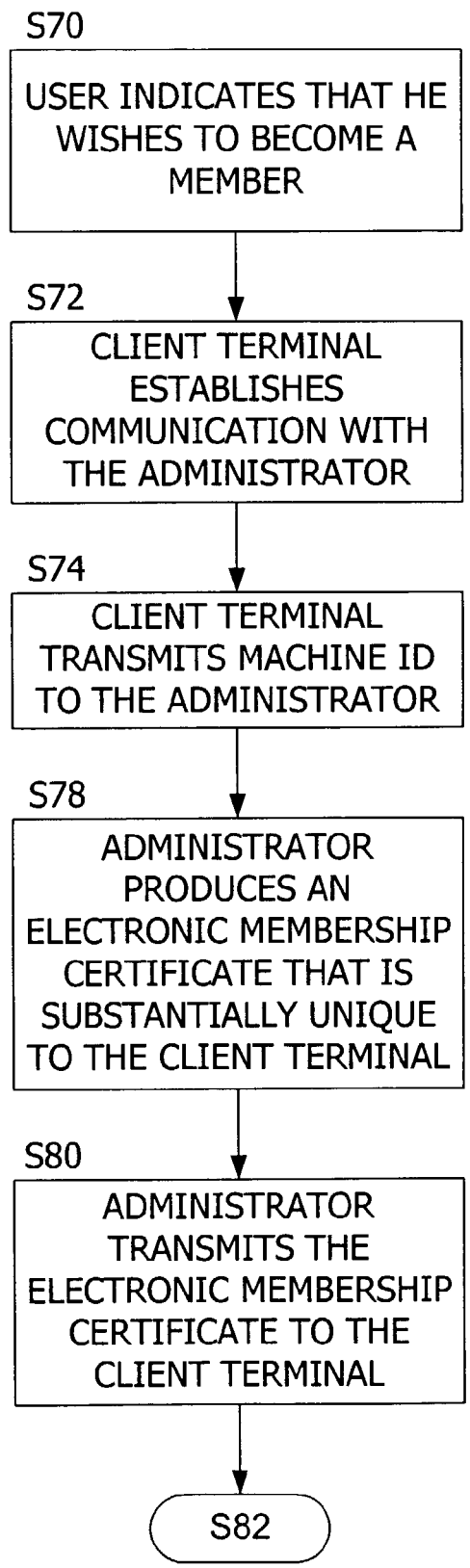
FIG. 21 is a flow diagram illustrating one or more further aspects of the present invention.

Reference is now made to FIG. 21, which is a process flow diagram illustrating one or more aspects of another embodiment of the present invention. This embodiment of the present invention contemplates the secure distribution of program content from a distributor of rental program content. The distributor of rental program content may be the administrative server 1, the third party server 2, or some other server (not shown). When a user of the client terminal apparatus 4 desires to rent program content, the user is preferably required to become a member of the rental system. In this regard, at step S70, the user indicates that he or she wishes to become a member of the system, for example, by way of activating mechanisms of the client terminal apparatus 4. By way of example, the client terminal apparatus 4 may contain and execute a suitable computer program that facilitates the membership process.

At step S72, the client terminal apparatus 4 establishes a communication link with the administrative server 1, preferably over the network 5. At step S74, a request by the client terminal apparatus 4 to become a member of the rental system is preferably made in which the client terminal apparatus 4 transmits the machine ID to the administrative server 1 over the network 5. In response, the administrative server 1 produces an electronic membership certificate, which is preferably substantially unique to the client terminal apparatus 4. The administrative server 1 may also associate the machine ID of the client terminal apparatus 4 with the electronic membership certificate, for example, using the database association techniques described hereinabove with respect to previous embodiments of the invention. At step S80, the administrative server 1 preferably transmits the electronic membership certificate to the client terminal apparatus 4 over the network 5. As will be described below, the electronic membership certificate is used in the rental process.

Figure 22:
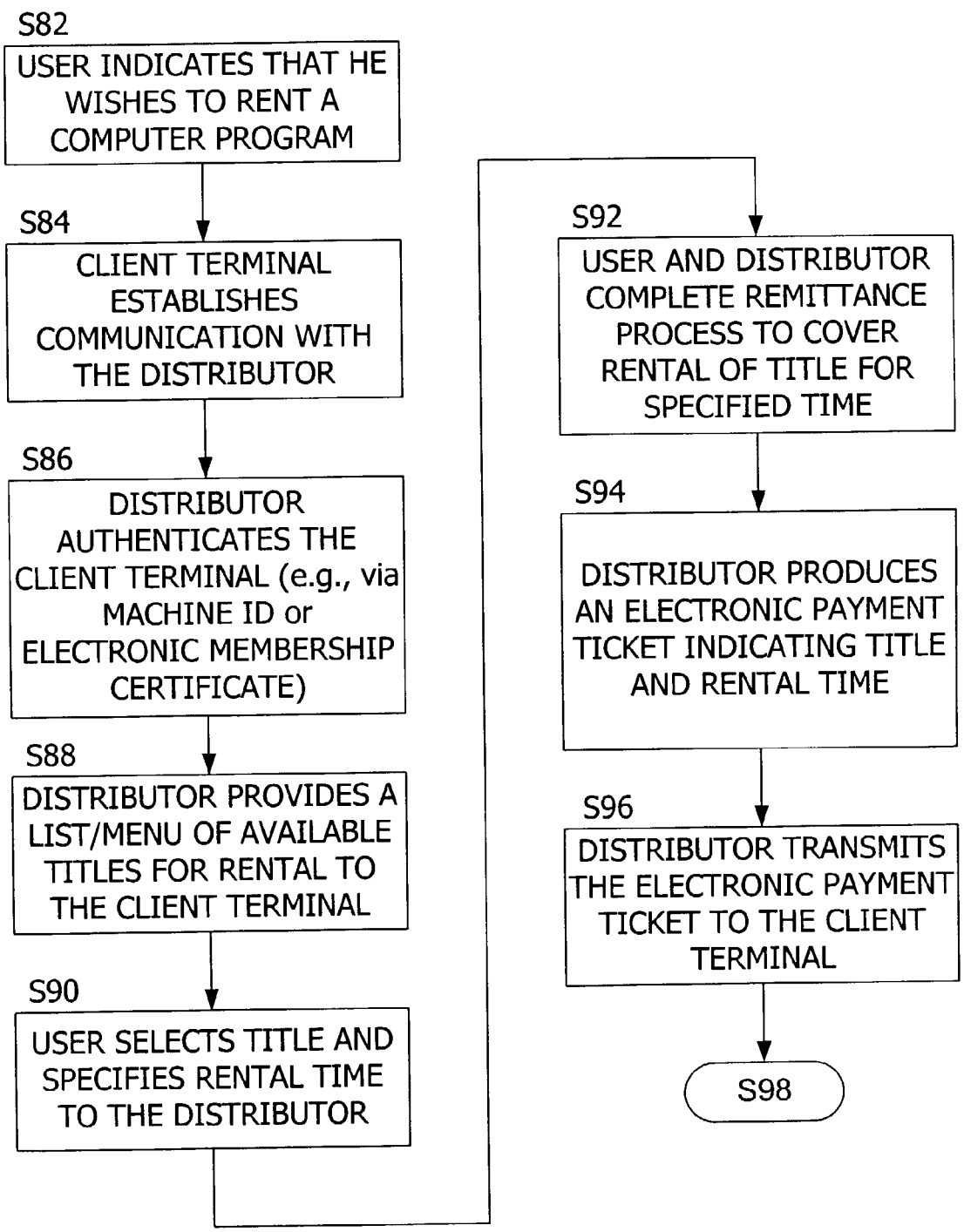
FIG. 22 is a flow diagram illustrating further process steps of the invention of FIG. 21.

Once the client terminal apparatus 4 has become a member of the rental system, the user is preferably permitted to rent program content, such as application programs, and system programs. In a preferred embodiment, the program content is preferably a video game computer program. With reference to FIG. 22, the computer software running on the client terminal apparatus 4 preferably permits the user to indicate that he or she wishes to rent a computer program. In response to an indication from the user in this regard (step 82), the client terminal apparatus 4 preferably establishes a communication link with the distributor (step S84) over which a rental request by the user is transmitted to the distributor. At step S86, the distributor preferably authenticates the client terminal apparatus 4, for example, by analyzing the machine ID of the client terminal apparatus 4 or by analyzing the electronic membership certificate thereof. This is accomplished by requiring that the client terminal apparatus 4 provide the machine ID and/or the electronic membership certificate to the distributor and that the distributor has access to a database where this information may be verified.

Assuming that the client terminal apparatus 4 has been authenticated, the distributor preferably provides a list or a menu of available titles for rental to the client terminal apparatus 4 over the network 5 (step S88). The computer software running on the client terminal apparatus 4 preferably facilitates the display of the list or menu of titles to the user so that the user may select a title and specify a rental time (step S90). The user's selection and specified rental time are preferably transmitted to the distributor over the network 5.

At step S92, the distributor preferably requires that the client terminal apparatus 4 provide remittance to cover the rental cost of the computer program for the specified time. This may be accomplished utilizing any of the known techniques, for example, by transmitting a credit card number, a demand deposit account number, by way of invoice, etc. Once remittance has been made, the distributor preferably produces an electronic payment ticket indicating that remittance has been made for the indicated title and rental time (step S94). At step S96, the distributor preferably transmits the electronic payment ticket to the client terminal apparatus 4 over the network 5.

In accordance with the present invention, the electronic payment ticket preferably provides the user (or client terminal apparatus 4) with a certain level of rental rights in exchange for the remittance provided to the distributor. For example, these rental rights may specify the title of the computer program, the rental time, the remittance value, etc. In addition, the electronic payment ticket may include additional information, such as a description key that is capable of decrypting the computer program. While it is not required that the electronic payment ticket include the decryption key, indeed the inclusion thereof is given by way of example only. It is also contemplated that the electronic payment ticket may include the decryption key in an encrypted form, for example, by encrypting it using the machine ID or utilizing other information that may be part of the electronic membership certificate (such as a virtual ID or the like). In any case, at this point in the process, the user has preferably received a certain level of rental rights, but has not yet received the computer program or an encrypted version of the computer program.

Figure 23:
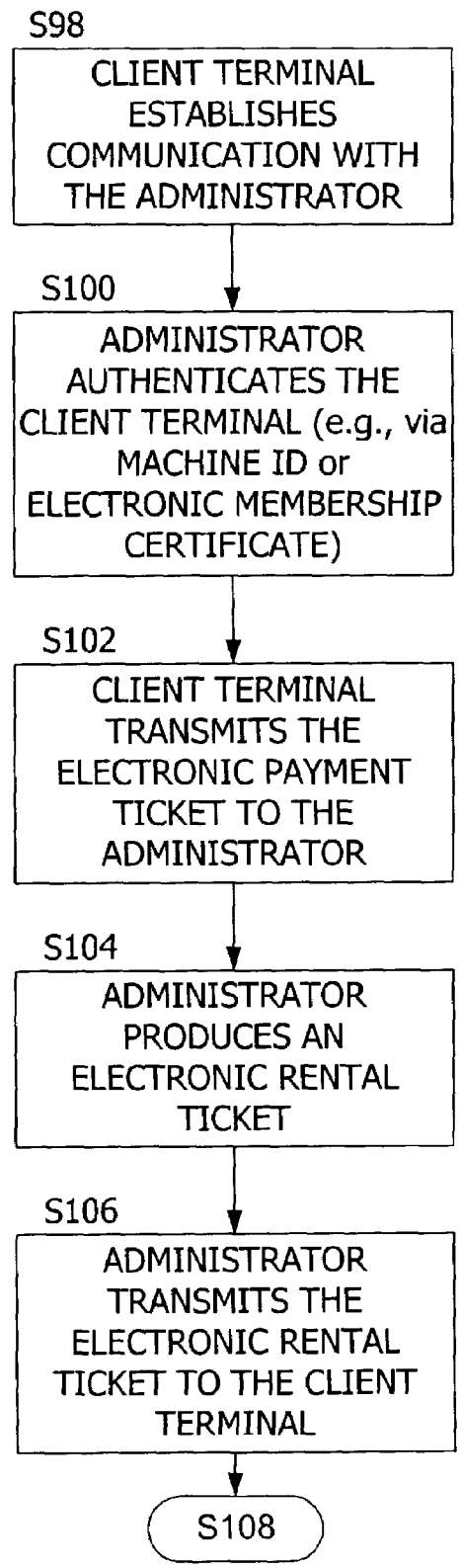
FIG. 23 is a flow diagram illustrating further process steps of the invention of FIG. 22.

At this stage in the process, the client terminal apparatus 4 has possession of its machine ID, the electronic membership certificate, and an electronic payment ticket indicating that remittance has been made for a title for a given period of time. With reference to FIG. 23, the client terminal apparatus 4 preferably establishes a communication link with the administrative server 1 over the network 5 (step S98). At step S100, the administrative server 1 preferably authenticates the client terminal apparatus 4 by way of the machine ID or electronic membership certificate. It is noted that this may be achieved by accessing an appropriate database, such as the personalizing database 6, which preferably contains the association of the machine ID of the client terminal apparatus 4 with the electronic membership certificate that was previously provided. At step S102, the client terminal apparatus 4 preferably transmits the electronic payment ticket to the administrative server 1 over the network 5. In response, the administrative server 1 preferably produces an electronic rental ticket (step 104) and transmits the electronic rental ticket to the client terminal apparatus 4 over the network 5 (step S106).

In accordance with the present invention, the electronic rental ticket preferably provides the user (or the client terminal apparatus 4) with a level of rental rights that may be the same as, or greater than, the rental rights provided by the electronic payment ticket. For example, the electronic rental ticket may specify the computer program title, the rental time, the remittance value, and may also include additional information, such as a decryption key that is capable of decrypting the encrypted computer program (assuming that the decryption key is not contained in the electronic payment ticket). While it is not required that the electronic rental ticket include the decryption key, indeed the inclusion thereof is given by way of example only. It is also contemplated that the electronic rental ticket may include the decryption key in an encrypted form, for example, by encrypting it using the machine ID or utilizing other information that may be part of the electronic membership certificate (such as a virtual ID or the like). In any case, at this point in the process, the user has preferably received a certain level of rental rights, but has not yet received the computer program or an encrypted version of the computer program.

Figure 24:
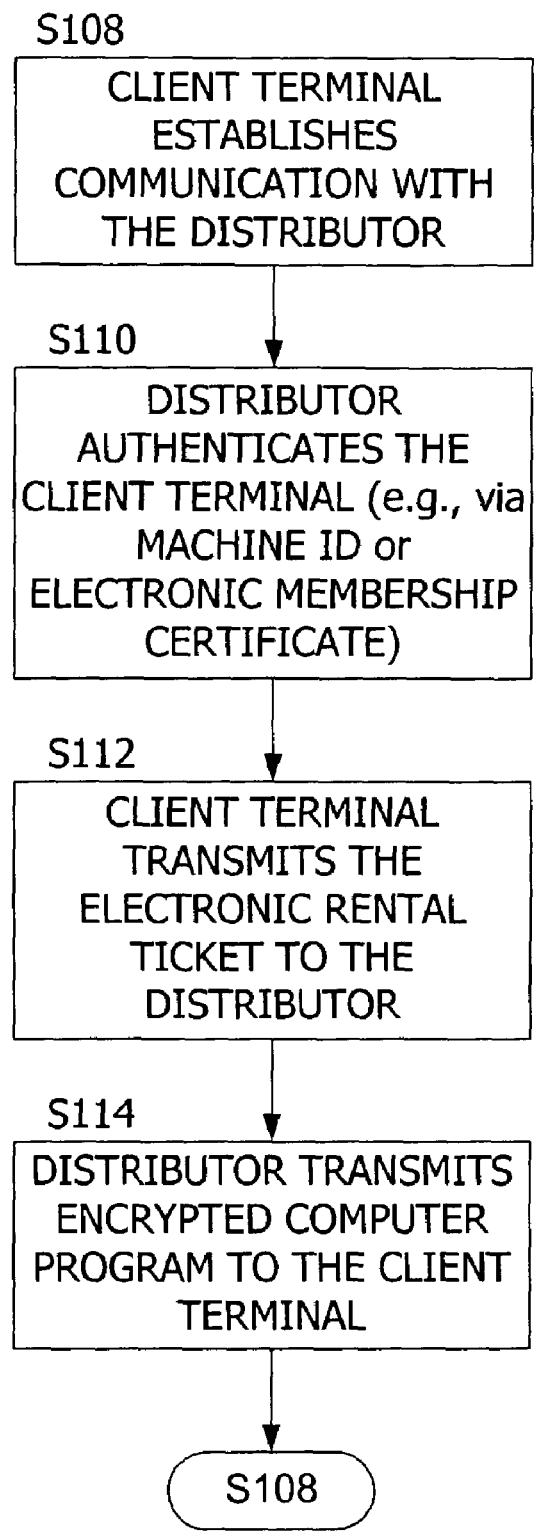
FIG. 24 is a flow diagram illustrating further process steps of the invention of FIG. 23.

With reference to FIG. 24, the client terminal apparatus 4 preferably establishes a communication link with the distributor over the network 5 (step S108). In response, the distributor may authenticate the client terminal apparatus 4, for example, by way of analysis of the machine ID or the electronic membership certificate as discussed hereinabove (step S110). Next, the client terminal apparatus 4 preferably transmits the electronic rental ticket (or at least a portion thereof) to the distributor over the network 5 (step S112). Preferably, this indicates to the distributor that the client terminal apparatus 4 has complete all previous necessary steps and is authorized to receive an encrypted version of the computer program for rental (step S114). At this point in the process, the client terminal apparatus 4 preferably has possession of the machine ID, the electronic membership certificate (including virtual ID if any), the electronic payment ticket, the electronic rental ticket, the encrypted decryption key, and the encrypted computer program.

In accordance with the present invention, it is contemplated that the user may load, install, and execute the computer program utilizing the processes described hereinabove with respect to previous embodiments of the invention. Advantageously, the rental system embodiment of the present invention enables the secure distribution of rental program content to any number of client terminal apparatus 4 over the network 5.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus operable to receive an encryoted program, said apparatus comprising:
a network interface operable to provide communication with a network such that (i) identification information related to the apparatus is transmitted over the network to an administrator, the identification information including a machine ID unique to the apparatus, (ii) an encrypted decryption key is received over the network from the administrator in response to the identifcation information, the encrypted decryption key being based on the machine ID, and (iii) an encrypted virtual ID is received over the network from the administrator, the virtual ID being associated with the machine ID;
a decryption device operable to decrypt the encrypted virtual ID using the machine ID, to decrypt the encrypted decryption key using the virtual ID, to decrypt the encrypted program using the decryption key, and to reencrypt the program using the virtual ID;
a first storage device operable to store the identification information and the re-encrypted program and to store the machine ID and the encrypted virtual ID;
a second storage device containing a machine ID; and
a processor operable to compare the machine ID stored in the first storage device with the machine ID contained in the second storage device, and to proscribe use of the machine ID contained in either of the storage devices to decrypt the encrypted virtual ID when the machine IDs do not match;
the network interface being further operable, when the machine ID contained in the second storage device does not match the machine ID stored in the first storage device, to facilitate:
the transmission of the machine ID contained in the second storage device over the network to the administrator, and
the reception of a new encrypted virtual ID over the network from the administrator if the administrator determines that the machine ID contained in the second storage device is also stored in a personalizing database, the new encrypted virtual ID having a new virtual ID associated with the machine ID contained in the second storage device.

2. The apparatus of claim 1, wherein:
the network interface is operable to facilitate transmission of the machine ID over the network to the administrator such that the encrypted decryption key is received over the network from the administrator in response to the machine ID.

3. The apparatus of claim 2, wherein the identification information includes a media ID that corresponds with a type of the first storage device.

4. The apparatus of claim 1, wherein the decryption device is operable to decrypt the encrypted virtual ID using the machine ID, and to decrypt the re-encrypted program using the virtual ID such that the apparatus is capable of executing the program.

5. The apparatus of claim 1, wherein the first storage device is removably connectable with the apparatus.

6. The apparatus of claim 1, wherein the processor is further operable to prompt a user of the apparatus to select a re-association routine when the machine ID stored in the first storage device does not match the machine ID contained in the second storage device.

7. The apparatus of claim 1, wherein the first storage device is further operable to replace the encrypted virtual ID with the new encrypted virtual ID.

8. The apparatus of claim 7, wherein the decryption device is operable to decrypt the new encrypted virtual ID using the machine ID contained in the second storage device, and to decrypt the re-encrypted program using the new virtual ID such that the apparatus is capable of executing the program.

9. The apparatus of claim 1, wherein the network interface is further operable to facilitate the reception of the encrypted program over the network from the administrator.

10. The apparatus of claim 1, wherein the program is one of an application program and a system program.

11. An apparatus operable to receive an encrypted program, said apparatus comprising:
a storage medium interface operable to receive an encrypted first decryption key from a storage medium produced by an administrator;
a network interface operable to provide communication with a network such that (i) identification information related to the apparatus is transmitted over the network to the administrator, the identification information including a machine ID unique to the apparatus, (ii) an encrypted second decryption key is received over the network from the administrator in response to the identification information, the encrypted second decryption key being based on the machine ID, and (iii) an encrypted virtual ID is received over the network from the administrator, the virtual ID being associated with the machine ID;
a decryption device operable to decrypt the encrypted virtual ID using the machine ID, to decrypt the encrypted second decryption key using the virtual ID, to decrypt the encrypted first decryption key using the second decryption key, to decrypt the encrypted program using the first decryption key, and to re-encrypt the program using the virtual ID;
a first storage device operable to store the identification information, and the re-encrypted program, the machine ID, and the encrypted virtual ID;
a second storage device operable to store a machine ID; and
a processor operable to compare the machine ID stored in the first storage device with the machine ID contained in the second storage device, and to proscribe use of the machine ID contained in either of the storage devices to decrypt the encrypted virtual ID when the machine IDs do not match;
the network interview being further operable to facilitate:
the transmission of the machine ID contained in the second storage device, when it does not match the machine ID stored in the first storage device, over the network to the administrator, and the reception of a new encrypted virtual ID over the network from the administrator, the new encrypted virtual ID having a new virtual ID associated with the machine ID contained in the second storage device.

12. The apparatus of claim 11, wherein:
the network interface is operable to facilitate transmission of the machine ID over the network to the administrator such that the encrypted second decryption key is received over the network from the administrator in response to the machine ID.

13. The apparatus of claim 12, wherein the identification information includes a media ID that corresponds with a type of the first storage device.

14. The apparatus of claim 11, wherein the decryption device is operable to decrypt the encrypted virtual ID using the machine ID, and to decrypt the re-encrypted program using the virtual ID such that the apparatus is capable of executing the program.

15. The apparatus of claim 11, wherein the first storage device is removably connectable with the apparatus.

16. The apparatus of claim 11, wherein the processor is further operable to prompt a user of the apparatus to select a re-association routine when the machine ID stored in the first storage device does not match the machine ID contained in the second storage device.

17. The apparatus of claim 11, wherein the first storage device is further operable to replace the encrypted virtual ID with the new encrypted virtual ID.

18. The apparatus of claim 17, wherein the decryption device is operable to decrypt the new encrypted virtual in using the machine ID contained in the second storage device, and to decrypt the re-encrypted program using the new virtual in such that the apparatus is capable of executing the program.

19. apparatus of claim 11, wherein the network interface is further operable to facilitate the reception of the encrypted program over the network from the administrator.

20. The apparatus of claim 11, wherein the program is one of an application program and a system program.

21. A method, comprising:
receiving an encrypted program at a processing apparatus;
transmitting identification information related to the processing apparatus over a network to an administrator, the identification information including a machine ID unique to the processing apparatus;
receiving an encrypted virtual ID and an encrypted decryption key at the processing apparatus over the network from the administrator in response to the identification information, the encrypted decryption key being based on the machine ID, the virtual ID being associated with the machine ID;
decrypting the encrypted virtual ID using the machine ID;
decrypting the encrypted decryption key using the virtual ID;
decrypting the encrypted program using the decryption key;
re-encrypting the program using the virtual ID;
storing the identification information and the re-encrypted program in a first storage device;
storing the machine ID and the encrypted virtual ID in the first storage device;
storing a machine ID in a second storage device;
comparing the machine ID stored in the first storage device with the machine ID contained in the second storage device and proscribing use of the machine ID contained in either of the storage devices to decrypt the encrypted virtual ID when the machine IDs do not match; and when the machine ID contained in the second storage device does not match the machine ID stored in the first storage device,
transmitting the machine ID contained in the second storage device over the network to the administrator, and
receiving a new encrypted virtual ID over the network from the administrator if the administrator determines that the machine ID contained in the second storage device is also stored in a personalizing database, the new encrypted virtual ID having a new virtual ID associated with the machine ID contained in the second storage device.

22. The method of claim 21, wherein:
the machine ID is transmitted over the network to the administrator such that the encrypted decryption key is received over the network from the administrator in response to the machine ID.

23. The method, of claim 22, wherein the identification information includes a media ID that corresponds with a type of the first storage device.

24. The method of claim 21, further comprising: decrypting the encrypted virtual ID using the machine ID, and decrypting the re-encrypted program using the virtual in such that the processing apparatus is capable of executing the program.

25. The method of claim 21, wherein the first storage device is removably connectable with the processing apparatus.

26. The method of claim 21, further Comprising prompting a user of the processing apparatus to select a re-association routine when the machine ID stored in the first storage device does not match the machine ID contained in the second storage device.

27. The method of claim 21, further compiising: replacing the encrypted virtual ID with the new encrypted virtual ID in the first storage device.

28. The method of claim 27, further comprising;
decrypting the new encrypted virtual ID using the machine ID contained in the second storage device, and
decrypting the re-encrypted program using the new virtual ID such that the processing apparatus is capable of executing the program.

29. The method of claim 21, further comprising receiving the encrypted program over the network from the administrator.

30. The method of claim 21, wherein the program is one of an application program and a system program.

31. A method, comprising:
receiving an encrypted program at a processing apparatus;
receiving an encrypted first decryption key at the processing apparatus,
transmitting identification information related to the processing apparatus over a network to an administrator, the identification information including a machine ID unique to the processing apparatus;
receiving an encrypted virtual ID and an encrypted second decryption key at the processing apparatus over the network from the administrator in response to the identification information, the encrypted second decryption key being based on the machine ID, the virtual ID being associated with the machine ID;
decrypting the encrypted virtual ID using the machine ID;
decrypting the encrypted second decryption key using the virtual ID;
decrypting the encrypted first decryption key using the second decryption key;

decrypting the encrypted program using the first decryption key;
re-encrypting the program using the virtual ID;
storing the identification information and the re-encrypted program in a first storage device;
storing the machine ID and the encrypted virtual ID in the first storage device;
comparing the machine ID stored in the first storage device with a machine ID contained in a second storage device;
proscribing use of the machine ID contained in either of the storage devices to decrypt the encrypted virtual ID when the machine IDs do not match; and
transmitting the machine ID contained in the second storage device, when it does not match the machine ID stored in the first storage device, over the network to the administrator; and receiving a new encrypted virtual ID over the network from the administrator, the new encrypted virtual ID having a new virtual ID associated with the machine ID contained in the second storage device.

32. The method of claim 31, wherein:
the machine ID is transmitted over the network to the administrator such that the encrypted decryption key is received over the network from the administrator in response to the machine ID.

33. The method of claim 32, wherein the identification information includes a media ID that corresponds with a type of the first storage device.

34. The method of claim 31, further comprising: decrypting the encrypted virtual ID using the machine ID, and decrypting the re-encrypted program using the virtual ID such that the processing apparatus is capable of executing the program.

35. The method of claim 31, wherein the first storage device is removably connectable with the processing apparatus.

36. The method of claim 31, further comprising prompting a user of the processing apparatus to select a re-association routine when the machine ID stored in the first storage device does not match the machine ID contained in the second storage device.

37. The method of claim 31, further comprising: replacing the encrypted virtual ID with the new encrypted virtual ID in the first storage device.

38. The method of claim 37 further comprising: decrypting the new encrypted virtual ID using the machine ID contained in the second storage device, and decrypting the re-encrypted program using the new virtual ID such that the processing apparatus is capable of executing the program.

39. The method of claim 31, further comprising receiving the encrypted program over the network from the administrator.

40. The method of claim 31, wherein the program is one of an application program and a system program.

* * * * *

UNITED STATES PATENT AND TRADEMARK OFFICE
CERTIFICATE OF CORRECTION

PATENT NO. : 7,469,345 B2
APPLICATION NO. : 10/316675
DATED : December 23, 2008
INVENTOR(S) : Muneki Shimada et al.

It is certified that error appears in the above-identified patent and that said Letters Patent is hereby corrected as shown below:

Column 4, line 6, "and" should read --an--.

Column 7, line 35, after "invokes", delete ",".

Column 17, line 19, "encryoted" should read --encrypted--.

Column 17, line 36, "reencrypt" should read --re-encrypt--.

Column 18, line 54, after "information,", delete "and".

Column 19, line 30, "in" should read --ID--.

Column 19, line 33, "in" should read --ID--.

Column 20, line 24, "in" should read --ID--.

Column 20, line 30, "Comprising" should read --comprising--.

Signed and Sealed this

Fourth Day of May, 2010

David J. Kappos
*Director of the United States Patent and Trademark Office*